United States Patent [19]

Gaalswyk

[11] Patent Number: 5,559,716
[45] Date of Patent: Sep. 24, 1996

[54] LIVESTOCK FEED CONSUMPTION METER

[76] Inventor: Mark K. Gaalswyk, R.R. One - Box 85, Welcome, Minn. 56181

[21] Appl. No.: 365,196

[22] Filed: Dec. 28, 1994

[51] Int. Cl.$^6$ .............................. G06F 19/00; A01K 5/00
[52] U.S. Cl. ................... 364/479.1; 119/51.02; 364/551.01
[58] Field of Search .................... 364/479, 478, 364/550, 551.01, 401; 119/51.01, 51.02

[56] References Cited

U.S. PATENT DOCUMENTS

| | | | |
|---|---|---|---|
| 4,049,950 | 9/1977 | Byrne et al. | 364/567 X |
| 4,463,353 | 7/1984 | Kuzara | 340/825.54 |
| 5,008,821 | 4/1991 | Pratt et al. | 119/51.02 X |
| 5,424,957 | 6/1995 | Kerkhoff et al. | 364/479 |
| 5,457,627 | 10/1995 | Cureton et al. | 364/401 |

*Primary Examiner*—Joseph Ruggiero
*Attorney, Agent, or Firm*—Henderson & Sturm

[57] ABSTRACT

An apparatus and method for monitoring livestock feed consumption from a bulk feed storage bin. The apparatus is a consumption meter including a data processing unit operably connected in communication with a mechanism for sensing the operation of a feed delivery motor. The method employs the consumption meter that senses the time the motor operates. Based on an estimated feed flow rate initially inputted by the operator, the data processing unit calculates and stores the amount of feed discharged from the storage bin by multiplying the estimated flow rate by the time the motor operates. Other inputted data including the number of animals being fed allows the calculation and storage of other data useful to the livestock producer. At times when the amount of feed in the storage bin is known, a comparison is made between this actual amount and the calculated amount based on the estimated flow rate. If a difference is found the consumption meter is reverse calibrated by use of a predetermined formula to adjust the estimated feed flow rate. Also, the stored data is adjusted and the difference is distributed over each of the days since the last calibration.

12 Claims, 2 Drawing Sheets

LIVESTOCK FEED CONSUMPTION METER

A portion of the disclosure of this patent document contains material which is subject to copyright protection. The copyright owner has no objection to the facsimile reproduction by anyone of the patent document or the patent disclosure, as it appears in the Patent and Trademark Office, patent file or records, but otherwise reserves all copyrights whatsoever.

TECHNICAL FIELD

This invention relates to livestock management, and more particularly to an apparatus and method for accurately monitoring livestock feed consumption.

BACKGROUND ART

Typically, livestock and poultry producers monitor feed consumption of the animals and maintain records to evaluate the efficiency and profitability of their operations. Although numerous systems are available, many are complicated and expensive to implement and use.

Those concerned with these and other problems recognize the need for an improved livestock feed consumption meter.

DISCLOSURE OF THE INVENTION

The present invention provides an apparatus and method for monitoring livestock feed consumption from a bulk feed storage bin. The apparatus is a consumption meter including a data processing unit operably connected in communication with a mechanism for sensing the operation of a feed delivery motor. The method employs the consumption meter that senses the time the motor operates. Based on an estimated feed flow rate initially inputted by the operator, the data processing unit calculates and stores the amount of feed discharged from the storage bin by multiplying the estimated flow rate by the time the motor operates. Other inputted data including the number of animals being fed allows the calculation and storage of other data useful to the livestock producer. At times when the amount of feed in the storage bin is known, a comparison is made between this actual amount and the calculated amount based on the estimated flow rate. If a difference is found the consumption meter is reverse calibrated by use of a predetermined formula to adjust the estimated feed flow rate. Also, the stored data is adjusted and the difference is distributed over each of the days since the last calibration.

An object of the present invention is the provision of an improved livestock feed consumption meter.

Another object is to provide a livestock feed consumption meter that can be reverse calibrated to update stored information relating to feed consumption.

A further object of the invention is the provision of a livestock feed consumption meter that is easy to use.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRY OUT THE INVENTION

Figure 1:
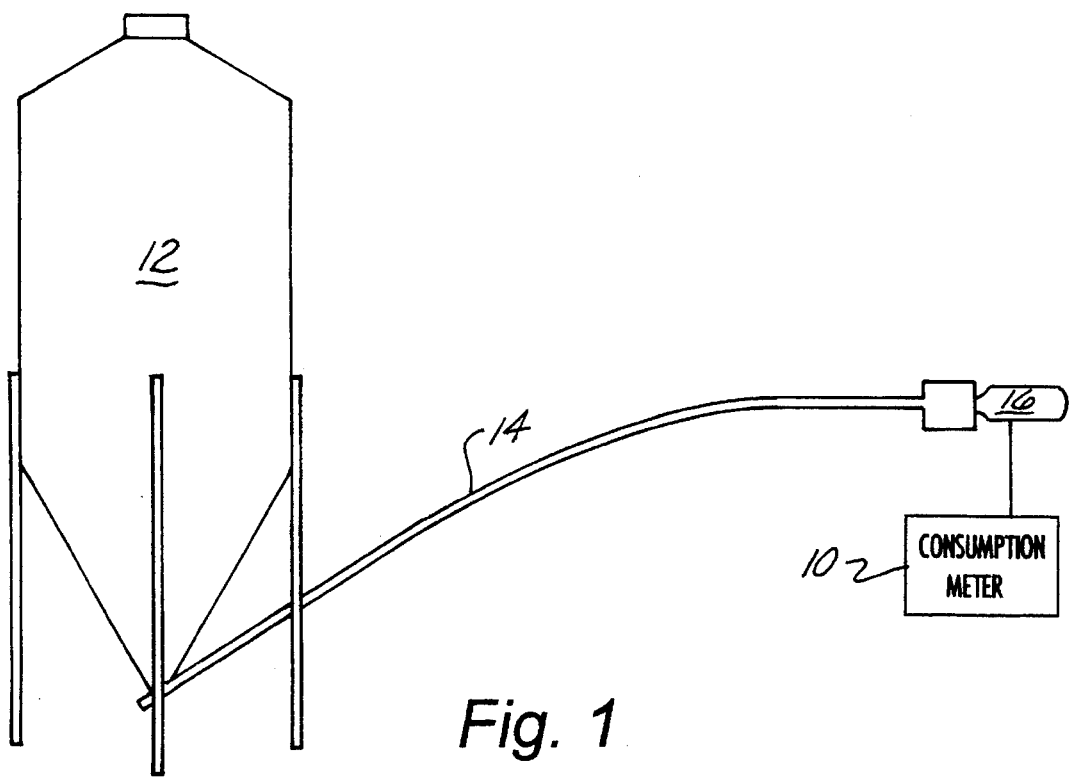
FIG. 1 is a schematic illustration of the consumption meter of the present invention used on a bulk feed storage bin.

Referring now to the drawings, wherein like reference numerals designate identical or corresponding parts throughout the several views, FIG. 1 shows the consumption meter (10) of the present invention used in conjunction with a bulk feed storage bin (12). The storage bin (12) includes a feed discharge system such as an auger (14) powered by an electrical motor (16).

Figure 2:
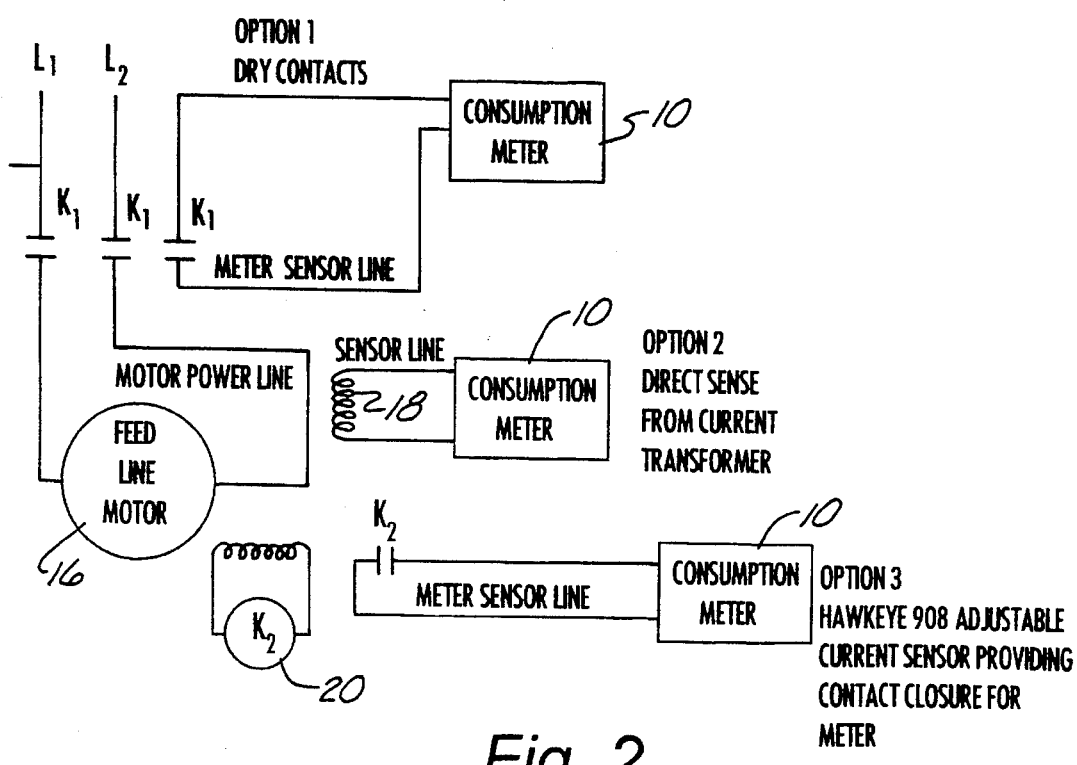
FIG. 2 is a schematic illustration of several options available to achieve the operable connection of a motor operation sensor and the consumption meter.

FIG. 2 illustrates three options for the consumption meter (10) to sense when the motor (16) is operating. The first option includes a dry contact switch K1 that is simultaneously activated when the motor (16) is activated. The second option includes a transformer (18) that acts as a current sensor and senses current when the motor (16) is activated. This is a direct sensation where the consumption meter (10) could be considered part of the circuit. The third option is similar to the second option with an extra element. The adjustable current sensor (20) detects current in the motor power line which in turn closes the dry contact switch K2 in the consumption meter sensor line.

The consumption meter (10) of the present invention economically monitors the amount of feed exiting bulk storage tanks (12). These values can be transmitted to a PC system for graphing and adjusting ratio as for actual feed intake.

The consumption meter (10):
1. Monitors feed being drawn from a bulk tank;
2. Stores data about that feed consumption;
3. Calculates certain averages; and
4. Makes the information available for downloading to a personal computer.

For individuals involved in livestock production, this information is invaluable for determining feed rations which maintain the health and proper diet of the livestock without the waste that occurs from over fortification.

The method of the present invention is practiced using an IBM compatible computer using software entitled "EZData" and "EZ Consumption Meter". These entire works are incorporated herein by reference and attached hereto as Appendix 1 and Appendix 2, respectively.

Reverse calibration is the feature of the present invention that makes a simple, volumetrically based feed consumption system become accurate enough to enable the producer to make good feed ration decisions. The mathematics used to accomplish this task is shown below:

CA=Calibration Amount (Actual Amount of Feed Left in the Bin)
MA=Metered Amount (Theoretical Amount of Feed Left in the Bin)
FD=MA-CA Feed Difference Between Metered and Calibrated Amounts
F0=Feed for Current Day
F1=Feed for First Day Previous to Current
Feed for Each Intervening Day of the Period
Fx=Balance of Feed for Day at Last Calibration
Ft=F0+F1 +F. . . +Fx Total Feed Fed During Calibration Period F0c=Calibrated Feed for Current Day
F1c=Calibrated Feed for First Day Previous to Current
F . . . c=Calibrated Feed for Each Intervening Day of the Period
Fxc=Calibrated Balance of Feed for Day at Last Calibration
FRm=Flow Rate Set in the Meter
FRc=Calibrated Flow Rate
FRd0=Flow Rate Stored for Current Day
FRD1=Flow Rate Stored for First Day Previous to Current
FRd . . =Flow Rate Stored for Each Intervening Day of the Period
FRdx=Flow Rate Stored for Balance of Day at Last Calibration
FRc0=Calibrated Flow Rate to Store for Current Day
FRc1=Calibrated Flow Rate to Store for First Day Previous to Current
FRc . . =Calibrated Flow Rate to Store for Each Intervening Day of the Period
FRcx=Calibrated Flow Rate to Store for Balance of Day at Last Calibration If MA−CA=0 [MA=CA] no updates are necessary. Simply mark the calibration record.

If MA−CA<>0 adjust feed fed for each day as follows:

$$
\begin{aligned}
F0c &= F0 + ((F0/Ft)*FD) \text{ or:} \\
&= F0 + ((F0/Ft)*(MA - CA)) \\
F1c &= F1 + ((F1/Ft)*FD) \text{ or:} \\
&= F1 + ((F1/Ft)*(MA - CA)) \\
F\ldots c &= F\ldots + ((F\ldots/Ft)*FD) \text{ or} \\
&= F\ldots + ((F\ldots/Ft)*(MA - CA)) \\
Fxc &= Fx + ((Fx/Ft)*FD) \text{ or} \\
&= Fx + ((Fx/Ft)*(MA - CA))
\end{aligned}
$$

Adjust the "Flow Rate" for each day as follows:

$$
\begin{aligned}
FRc0 &= FRd0 + (FRd0*(FD/(Ft + FD))) \text{ or:} \\
&= FRd0 + (FRd0*((MA - CA)/(Ft + (MA - CA)))) \\
FRc1 &= FRd1 + (FRd1*(FD/(Ft + FD))) \text{ or:} \\
&= FRd1 + (FRd1*((MA - CA)/(Ft + (MA - CA)))) \\
FRc\ldots &= FRd\ldots + (FRd\ldots*(FD/(Ft + FD))) \text{ or:} \\
&= FRd\ldots + (FRd\ldots * ((MA - CA)/(Ft + (MA - CA)))) \\
FRcx &= FRdx + (FRd0*(FD/(Ft + FD))) \text{ or:} \\
&= FRdx + (FRdx*((MA - CA)/(Ft + (MA - CA))))
\end{aligned}
$$

Mark the calibration record.
Adjust the Flow Rate as follows:

$$
\begin{aligned}
FRc &= FRm + (FRm*(FD/(Ft + FD))) \text{ or:} \\
&= FRm + (FRm*((MA - CA)/(Ft + (MA - CA))))
\end{aligned}
$$

Adjust MA to equal CA.

Figure 3:
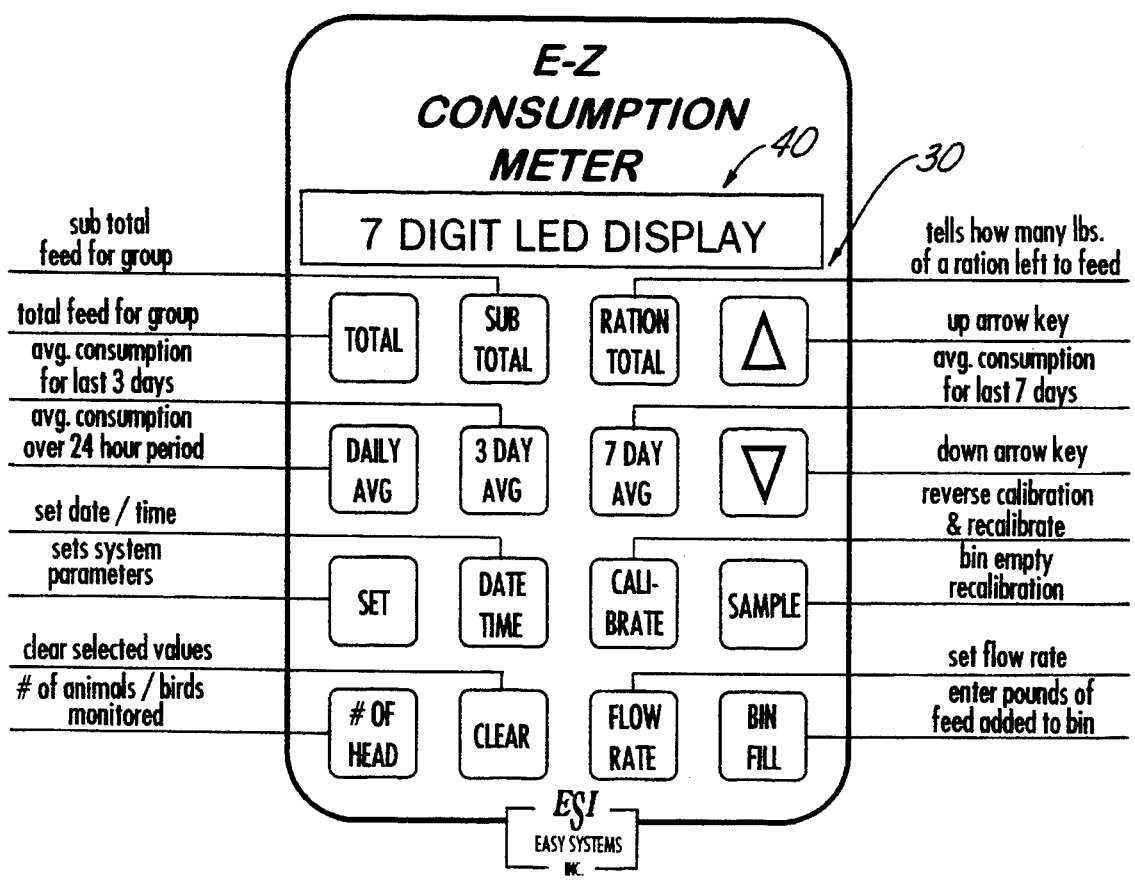
FIG. 3 is a front elevational view of the key pad and data display of the consumption meter.

FIG. 3 shows the key pad (30) and LED display (40) Of the consumption meter (10). The lead lines directed to the individual keys indicate their functions.

Physically, the user begins using the consumption meter (10) of the present invention by plugging it in to a 110 VAC outlet and connecting the current sensor to the motor (16) to be monitored. The user then sets the date and time with the "Date/Time" button and the arrows. The first press of the "Date/Time" button displays the current setting of the date and time. The second press of the "Date/Time" button begins the process of resetting by first displaying the month, then the day, the year, the hour and the minute. At each stage, the user presses the "up" arrow to increase the setting or the "down" arrow to decrease the setting.

Next, the user sets the number of head in a similar manner to the date and time using the "# of Head" button.

Next, the flow rate is set using the "Flow Rate" button. At this point, the user will make an estimate of the flow rate based on a simple test of running the auger (14) or other feed delivery device for a certain length of time, capturing the feed in a bucket and then weighing the feed. The flow rate is set in pounds per minute.

The consumption meter assumes there is no feed in the bulk tank when first placed in service. Pressing the "Bin Refill" button and entering an amount establishes either the feed still remaining in the tank or the feed added at this time.

Finally, the user presses the "Sample" button twice to set the sample time. The sample time is the time of day that the consumption meter stores the contents of its daily memory registers to its history memory registers. This is also the time when the "Daily Avg", "3 Day Avg", and "7 Day Avg" are updated. The user sets this to a time when the equipment will not be running, e.g. 2 AM.

The consumption meter operates automatically on a daily basis until the next bin refill, calibration day or change in number of head. Whenever the feed delivery motor turns on and the amps exceed the "no load" amperage of the motor (16), the consumption meter (10) begins to accumulate the pounds of feed going to the feeders in the barn or other facility. The basic mathematical formula is Flow Rate×Run time=Feed Fed. The amounts accumulate on the "Total" button, the "Subtotal" button, and the Daily memory registers. At the same time the "Ration Total" button is decreasing. The user might have used this button to track how much of a certain ration was planned to be fed to the livestock and therefore, how much remains.

At the sample time each day, the contents of the daily memory registers (i.e. the date, the total feed fed for the day, the flow rate, and the number of head) are stored in the history memory registers of the consumption meter (10).

When the bin (12) runs empty, or at any time when the user feels confident that the amount of feed left in the bin is known, the "Calibrate" button is pressed, the user accepts the zero default or enters the amount of feed left, and then the consumption meter (10) reverse calibrates all of the information stored in the history memory registers. The idea here is the feed is weighed going into the bin and does not need to be weighed going out of the bin.

The actual total feed by weight, that went into the bin is known. A theoretical or calculated total of how much the user thinks was fed out of the bin is available It only requires a determination of the difference and proper distribution of the difference over each of the days involved since the last calibration. Feed changes, due to the different feed densities, may have necessitated changes of flow rates during the calibration cycle. Additionally, as the animals grew, they were consuming more feed on a daily basis unless, of course illness or weather caused them to eat less. All of these changes are taken into account in the reverse calibration process.

It may be easiest to understand by viewing the following two tables, the first of which is prior to reverse calibration and the second of which follows reverse calibration.

TABLE 1

| Date | # of Head | Flow Rate | Feed Fed | Bin Refills |
| --- | --- | --- | --- | --- |
| Previous | Calibration | Day | | |
| 06/01/94 | 450 | 150 | 1350 | 10,000 |
| 06/02/94 | 450 | 150 | 1372.5 | |
| 06/03/94 | 448 | 150 | 1388.8 | |
| 06/04/94 | 448 | 150 | 1411.2 | |
| 06/05/94 | 447 | 150 | 1408.05 | |

TABLE 1-continued

| Date | # of Head | Flow Rate | Feed Fed | Bin Refills |
| --- | --- | --- | --- | --- |
| 06/06/94 | 447 | 150 | 1430.4 | |
| 06/07/94 | 447 | 150 | 1452.75 | 2,000 |
| 06/08/94 | 447 | 140 | 1463.93 | |
| 06/08/94 | 447 | 140 | 600 | |
| Totals | NA | NA | 11,877.63 | 12,000 |
| Difference | | | 122.37 | |

TABLE 2

| Date | # of Head | Flow Rate | Feed Fed | Bin Refills |
| --- | --- | --- | --- | --- |
| Previous | Calibration | Day | | |
| 06/01/94 | 450 | 151.53 | 1363.91 | 10,000 |
| 06/02/94 | 450 | 151.53 | 1386.64 | |
| 06/03/94 | 448 | 151.53 | 1403.11 | |
| 06/04/94 | 448 | 151.53 | 1425.74 | |
| 06/05/94 | 447 | 151.53 | 1422.56 | |
| 06/06/94 | 447 | 151.53 | 1445.14 | |
| 06/07/94 | 447 | 151.53 | 1467.72 | 2,000 |
| 06/08/94 | 447 | 141.53 | 1479.01 | |
| 06/08/94 | 447 | 141.53 | 606.18 | |
| Totals | NA | NA | 12,000.01 | 12,000 |
| Difference | | | −.01 | |

For calibrating the "Jun. 01, 1994" day, the applicable formula is $F_{0c} = F_0 + ((F_0/F_T)*F_d)$ where, $F_{0c}$ is the calibrated feed fed on the first day;

$F_0$ is the metered feed fed on the first day;

$F_t$ is the total feed fed according to the meter; and $F_D$ is the difference between metered and actual $$F_{0c} = [F_0]1350 + (([F_0]1350/[F_t]11{,}877.63)*[F_D]1122.37)$$

$$F_{0c} = 1350 + (0.113659*122.37) = 1350 + 13.908456 = 1353.908456 = 1363.91$$

The daily flow rate is calibrated as follows: $F_{Rc0} = F_{Rd0} + (F_{Rd0}*(F_D/(F_t + F_d)))$ where, $F_{Rc0}$ is the calibrated flow rate for the day;

$F_{Rd0}$ is the meter flow rate for the day;

$F_D$ is the feed fed difference; and $F_t$ is the metered total feed fed.

$$F_{Rc0} = [F_{Rd0}]150 + ([F_{Rd0}]150*([F_D]122.37/([F_t]11{,}877.63 + [F_D]122.37)))$$

$$F_{Rc0} = 150 + (150*(122.37/12{,}000)) = 150 + (150*0.0101975) = 150 + 1.529625$$

$$F_{Rc0} = 151.529625 = 151.53$$

The reverse calibration process enables the user to achieve a high degree of accuracy in an area of business which has always been very difficult to manage without a lot of additional time and expense.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise that as specifically described.

APPENDIX 1

"EZData"
Computer Program
(15 pages)

```
/*
EZDATA.C

Copyright (C) CIM Software Corporation, 1993.  All Rights Reserved.

===========================================================================
                    C I M   S O F T W A R E   C O R P O R A T I O N
                              5735 Lindsay Street
                            Minneapolis, Minnesota 55422
                                   (612) 544-1752
===========================================================================

Developed for:
   Easy Systems consumption meter communications program.

Description:
   Serial communications program.

Revision History:
   Version 1.00 - Joel Schneider, CIM Software Corporation - 08/16/93
      Initial version - based on code from CIMIOTSR.C (job C93-415).
      This program performs interrupt driven serial communications in
      both directions (send and receive).
   Eric Peterson - CIM Software - 09-02-94
      - changed baud rate from 9600 to 2400
   Eric Peterson - CIM Software - 09-09-94
      - changed baud rate from 2400 to 300
   Joel Schneider - CIM Software - 09-09-94
      - changed baud rate from 300 to 1200
   Eric Peterson - CIM Software - 10-28-94 - Version 1.01
      - changed RECVQUIK protocol.  Added three more data fields for current
        day average, three day average, and seven day average.  Each of these
        fields is 9 data bytes.  This added 27 bytes to the RECVQUIK message.
   Eric Peterson - CIM Software - 11-16-94
      - added header text in process_RECVHIST() for one, three, and seven
        day averages.

Compile Options Used:
   Microsoft C/C++ version 7.0
   Refer to the make file, "EZDATA.MAK".
*/ include <stdio.h>
include <stdlib.h>
#include <conio.h>
#include <dos.h>
#include <process.h>
#include <string.h>
#include <time.h>

Page: 1
Date: 11/16/94
File: EZDATA.C include <sys\types.h>
include <sys\stat.h>
include <signal.h> define VERSION "1.01"      /* version number for this program */ define CHECKSUM            /* enable/disable checksum testing on received data */
// #define TESTCOM          /* enable/disable test code */ define RETRYLIMIT   2      /* maximum retries per comm attempt */
define LOOPLIMIT  100      /* maximum loops (1/20 sec) per retry */ define CH_ETX   '\3'       /* ETX character */
define CH_ACK   '\6'       /* ACK character */
#define CH_NAK   '\7'       /* NAK character */
#define CH_CAN   '\x18'     /* CAN character */
define CH_RS    '\x1E'     /* RS character */ define CH_RECVQUIK  '1'    /* character for RECVQUIK command */
define CH_RECVHIST  '2'    /* character for RECVHIST command */
define CH_SENDQUIK  '3'    /* character for SENDQUIK command */ define CH_HISTREC   'H'    /* character for historical data record */
define CH_BINREC    'B'    /* character for bin refill data record */ define MASK7    0x7F       /* bit mask for lowest 7 bits */ define SBUFSIZ  0x0400            /* Serial buffer size */
define SBUFMSK  (SBUFSIZ-1)       /* mask for serial buffer offset */ define FALSE    0
define TRUE     (!FALSE)

#define NOERROR  0          /* No error */
#define BUFOVFL  1          /* Buffer overflowed */

/*
-------------------------------------------------------------------
*/

/*
   The 8250 UART has 10 registers accessible through 7 port addresses.
   Here are their addresses relative to COM1BASE and COM2BASE.  Note
   that the baud rate registers, (DLL) and (DLH) are active only when
   the Divisor-Latch Access-Bit (DLAB) is on.  The (DLAB) is bit 7 of
   the (LCR).

o TXR Output data to the serial port.
   o RXR Input data from the serial port.
   o LCR Initialize the serial port.
```

```
o IER Controls interrupt generation.
o IIR Identifies interrupts.
o MCR Send control signals to the modem.
o LSR Monitor the status of the serial port.
o MSR Receive status of the modem.
o DLL Low byte of baud rate divisor.
o DHH High byte of baud rate divisor.
*/
#define UREG_TXR    0   /* Transmit register (WRITE) */
#define UREG_RXR    0   /* Receive register (READ)   */
#define UREG_IER    1   /* Interrupt Enable          */
#define UREG_IIR    2   /* Interrupt ID              */
#define UREG_LCR    3   /* Line control              */
#define UREG_MCR    4   /* Modem control             */
#define UREG_LSR    5   /* Line Status               */
#define UREG_MSR    6   /* Modem Status              */
#define UREG_DLL    0   /* Divisor Latch Low         */
#define UREG_DLH    1   /* Divisor Latch High        */

/*
Bit values held in the Line Control Register (LCR).
bit    meaning
---    -------
0-1    00=5 bits, 01=6 bits, 10=7 bits, 11=8 bits.
2      Stop bits.
3      0=parity off, 1=parity on.
4      0=parity odd, 1=parity even.
5      Sticky parity.
6      Set break.
7      Toggle port addresses.
*/

/*
Bit values held in the Line Status Register (LSR).
bit    meaning
---    -------
0      Data ready.
1      Overrun error - Data register overwritten.
2      Parity error - bad transmission.
3      Framing error - No stop bit was found.
4      Break detect - End to transmission requested.
5      Transmitter holding register is empty.
6      Transmitter shift register is empty.
7      Time out - off line.
*/
#define LSR_RCVRDY   0x01
#define LSR_OVERR    0x02
#define LSR_PRTYERR  0x04
#define LSR_FRMERR   0x08
#define LSR_BRKERR   0x10
#define LSR_XMTRDY   0x20
#define LSR_XMTRSR   0x40
#define LSR_TIMEOUT  0x80

/*
Bit values held in the Modem Output Control Register (MCR).
bit    meaning
---    -------
0      Data Terminal Ready. Computer ready to go.
1      Request To Send. Computer wants to send data.
2      auxiliary output #1.
3      auxiliary output #2.(Note: This bit must be
       set to allow the communications card to send
       interrupts to the system)
4      UART output looped back as input.
5-7    not used.

0x01
                     0x02
                     0x08
*/
#define MCR_DTR
#define MCR_RTS
define MCR_INT /*
Bit values held in the Modem Input Status Register (MSR).
bit    meaning
---    -------
0      delta Clear To Send.
1      delta Data Set Ready.
2      delta Ring Indicator.
3      delta Data Carrier Detect.
4      Clear To Send.
5      Data Set Ready.
6      Ring Indicator.
7      Data Carrier Detect.

0x10
                     0x20
*/
#define MSR_CTS
#define MSR_DSR

/*
Bit values held in the Interrupt Enable Register (IER).
bit    meaning
---    -------
0      interrupt when data received.
1      interrupt when transmitter holding reg. empty.
2      interrupt when data reception error.
3      interrupt when change in modem status register.
4-7    Not used.

/* #define IER_INT     0x01 */
#define IER_INT     0x03

/*
Bit values held in the Interrupt Identification Register (IIR).
bit    meaning
---    -------
0      Interrupt pending
1-2    Interrupt ID code
```

Page: 2
Date: 11/16/94
File: EZDATA.C

```
                              00=Change in modem status register,
                              01=Transmitter holding register empty,
                              10=Data received,
                              11=reception error, or break encountered.
        3-7                   Not used.
*/
#define IIR_TX        0x02
#define IIR_ID        0x04
#define IIR_MASK      0x07

/*
        These are the port addresses of the 8259 Programmable Interrupt
        Controller (PIC).
*/
#define PIC_IMR       0x21    /* Interrupt Mask Register port */
#define PIC_ICR       0x20    /* Interrupt Control Port */

/*
        The IMR tells the PIC to service an interrupt only if it
        is not masked (FALSE).
*/
#define IMR_IRQ3      0xF7    /* COM2,COM4 */
#define IMR_IRQ4      0xEF    /* COM1,COM3 */

/*
        An end of interrupt needs to be sent to the Control Port of
        the 8259 when a hardware interrupt ends.
*/
#define ICR_EOI       0x20    /* End of Interrupt */

/*
------------------------------------------------------------------
*/

/* data structure for recording information about a serial port */
typedef struct PORTDATA_S
{
        int     port;           /* port number; (0-3) = COM 1-4 */
        int     SError;
        int     portbase;
        void (__cdecl __interrupt __far * oldIRQvect)();
        unsigned int    rcvbuf_start;
        unsigned int    rcvbuf_end;
        unsigned int    sndbuf_start;
        unsigned int    sndbuf_end;
        unsigned char   rcvbuf[SBUFSIZ];
        unsigned char   sndbuf[SBUFSIZ];
} PORTDATA_T;

/* global data used by hardware IRQ interrupt handlers */

Page: 3
Date: 11/16/94
File: EZDATA.C
```

```
PORTDATA_T sPORTinfo =          /* information about COM port */
        ( 0, NOERROR, 0, NULL, 0, 0, 0, 0 );

/* boolean flag, set to TRUE if program interrupted */
int bProgramAbort = FALSE;

/* boolean flag for debug mode */
int bDebug = FALSE;

/*
 *  convert a single digit to hexadecimal
 */
unsigned char hexdigit(
        unsigned uNum )
{
        static char acMap[] = "0123456789ABCDEF";

if( uNum < 16 ) return( acMap[uNum] );
        return( '?' );
}

/*
 *  compute checksum and return ptr to static array containing returned value */
char * checksum(
        unsigned char * cpData,   /* ptr to data string */
        int     iDataLen )        /* length of data string */
{
        unsigned uChkSum;
        int iPos;
        static char acChkSum[2];  /* static buffer for checksum characters */ uChkSum = 0;
        for( iPos = 0; iPos < iDataLen; iPos++ )
        {
                uChkSum = ( ( uChkSum << 1 ) + (unsigned)cpData[iPos] ) & 0xFF;
        }
        acChkSum[0] = hexdigit( ( uChkSum >> 4 ) & 0xF );
        acChkSum[1] = hexdigit( uChkSum & 0xF );

return( acChkSum );
}

/*
 *  test checksum on a data string, return TRUE if ok, FALSE if not */
int test_checksum(
        char *  cpBuf,            /* ptr to data buffer */
        int     iDataLen )        /* length of data (preceding chksum characters) */
{
        if( strncmp( cpBuf + iDataLen, checksum( cpBuf, iDataLen ), 2 ) == 0 )
        {
```

```c
            printf( " .. Checksum: %.2s, OK", checksum( cpBuf, iDataLen ));
            return( TRUE );
        }
    printf( " .. Checksum: %.2s, BAD", checksum( cpBuf, iDataLen ));
    return( FALSE );
}

/*
 * delay() - pause for a specified amount of time */
void delay(
    unsigned duration )         /* duration, in PC clock ticks (18.2 per second) */
{
    union REGS reg;             /* register structure for int86() */
    unsigned starttime, timenow, timediff, maxval;

reg.h.ah = 0x00;            /* function 00h = read current clock count */
    int86( 0x1A, ®, ® );  /* call time/date BIOS */
    starttime = reg.x.dx;
    timediff = 0;
    while( timediff < duration )
    {
        reg.h.ah = 0x00;
        int86( 0x1A, ®, ® );  /* function 00h = read current clock */
        timenow = reg.x.dx;         /* call time/date BIOS */
        if( timenow < starttime )   /* compute time expired */
        {
            maxval = 65535;
            timediff = timenow + ( maxval - starttime ) + 1;
        }
        else timediff = timenow - starttime;

kbhit();    /* spend some time in keyboard BIOS, to allow flow control */
    }
}

/*
 * Interrupt handler for hardware IRQ - send and receive data via UART */
void _cdecl _interrupt _far IRQ_int( void )
{
    int         portbase;
    unsigned    intrpt_id;
    unsigned    buf_end;

/* get interrupt id value */
    portbase = sPORTinfo.portbase;
    intrpt_id = _inp(portbase + UREG_IIR) & IIR_MASK;

/* check for data received */
    if( ( intrpt_id & IIR_ID ) != 0 )
    {
        /* check for buffer overflow and update buffer status */
        buf_end = ( sPORTinfo.rcvbuf_end + 1 ) & SBUFMSK;
        if( buf_end == sPORTinfo.rcvbuf_start )
            sPORTinfo.serror = BUFOVFL;
        else
        {
            /* put data into buffer */
            sPORTinfo.rcvbuf[sPORTinfo.rcvbuf_end] =
                _inp( portbase + UREG_RXR );

/* update buffer end position */
            sPORTinfo.rcvbuf_end = buf_end;
        }
    }

/* check for transmit holding register empty */
    if( ( intrpt_id & IIR_TX ) != 0 )
    {
        /* send data, if any in buffer */
        if( sPORTinfo.sndbuf_start != sPORTinfo.sndbuf_end )
        {
            _outp( portbase + UREG_TXR,
                sPORTinfo.sndbuf[sPORTinfo.sndbuf_start] );
            sPORTinfo.sndbuf_start = ( sPORTinfo.sndbuf_start + 1 ) & SBUFMSK;
        }
    }

/* signal end of hardware interrupt */
    _outp(PIC_ICR, ICR_EOI);
}

/*
 * set port to 2400 baud, 8 data bits, no parity, 1 stop bit */
int com_setup( void )
{
    long baud;
    int  divisor;
    int  c;
    int  portbase;

portbase = sPORTinfo.portbase;

/* compute baud rate divisor for UART */
    baud=1200L; /* 09-02-94 - ERP changed baud from 9600 */
                /* 09-09-94 - ERP changed baud from 2400 */
                /* 09-09-94 - JTS trying baud at 1200 */
    divisor = (int) (115200L/baud);

/* disable interrupts */
    _disable();

/* set baud rate (divisor) */
    c = _inp( portbase + UREG_LCR );
```

```c
    _outp( portbase + UREG_LCR, (c | 0x80) ); /* Set DLAB */
    _outp( portbase + UREG_DLL, (divisor & 0x00FF) );
    _outp( portbase + UREG_DLH, ((divisor >> 8) & 0x00FF) );
    _outp( portbase + UREG_LCR, c);              /* Reset DLAB */

/* set other comm parameters (0x03 => N81) */
    /* bits:  4,3: parity   2: stop bits  1,0: word length */
    /*             X0=none             0=1 bit     10=7 bits */
    /*             01=odd              1=2 bit     11=8 bits */
    /*             11=even                                   */
    _outp( portbase + UREG_LCR, 0x03 );

/* reset buffers */
    sPORTinfo.rcvbuf_end = sPORTinfo.rcvbuf_start = 0;
    sPORTinfo.sndbuf_end = sPORTinfo.sndbuf_start = 0;

/* enable interrupts */
    _enable();

return( 0 );
}

/*---------------------------------------------------------*/
/* write data to serial port, return number of characters written */
unsigned com_write(
    char      *cpData,
    unsigned  uDataLen )
{
    int       portbase;
    unsigned  uMaxData;
    int       iBufStatus;
    unsigned  u, i;
    int       iXMTRDY;

portbase = sPORTinfo.portbase;

disable();
    /* copy data into transmit buffer */
    iBufStatus = 0;
    if( sPORTinfo.sndbuf_start < sPORTinfo.sndbuf_end )
    {
        iBufStatus = 1;
        uMaxData = sPORTinfo.sndbuf_start + ( SBUFMSK - sPORTinfo.sndbuf_end );
    }
    else if( sPORTinfo.sndbuf_start > sPORTinfo.sndbuf_end )
    {
        iBufStatus = 2;
        uMaxData = sPORTinfo.sndbuf_start - sPORTinfo.sndbuf_end - 1;
    }
    else
    {
        iBufStatus = 3;
        uMaxData = SBUFMSK;
    }

/* check buffer size vs data length */
    if( uMaxData < uDataLen )
    {
        iBufStatus = 0;
    }
    else
    {
        /* copy data into buffer */
        for( u = 0; u < uDataLen; u++ )
        {
            sPORTinfo.sndbuf[sPORTinfo.sndbuf_end] = cpData[u];
            sPORTinfo.sndbuf_end = ( sPORTinfo.sndbuf_end + 1 ) & SBUFMSK;
        }
    }

/* jump start UART data transmission (interrupt driven after first char) */
    if( iBufStatus == 3 )
    {
        /* check line status register */
        iXMTRDY = _inp( portbase + UREG_LSR ) & LSR_XMTRDY;
        if( iXMTRDY == 0 )
        {
            /* wait at least one full timer tick */
            enable();
            delay( 2 );
            disable();
            iXMTRDY = _inp( portbase + UREG_LSR ) & LSR_XMTRDY;
        }
        if( iXMTRDY != 0 )
        {
            /* write character to serial port */
            _outp( portbase + UREG_TXR,
                sPORTinfo.sndbuf[sPORTinfo.sndbuf_start] );
            sPORTinfo.sndbuf_start++;
        }
        else iBufStatus = 0;
    }
    _enable();

/* If in debug mode, display outgoing data */
    if( bDebug && ( u > 0 ) )
    {
        printf( "\ncom_write() ---> \"" );
        for( i = 0; i < u; i++ )
        {
            putch( cpData[i] );
        }
        printf( "\" (%u)", u );
    }
}
```

Page: 5
Date: 11/16/94
File: EZDATA.C

```c
        /* return number of characters transmitted */
        if( iBufStatus == 0 ) return( 0 );
        else return( uDatalen );
}

/*
*/
/* read data from serial port, returns number of bytes read */
unsigned com_read(
        char    * cpData,
        unsigned uMaxData )
{
        unsigned uData;
        unsigned i;

_disable();
        /* copy data from buffer */
        uData = 0;
        while( ( uData < uMaxData ) &&
               ( sPORTinfo.rcvbuf_start != sPORTinfo.rcvbuf_end ) )
        {
                cpData[uData] = (int) sPORTinfo.rcvbuf[sPORTinfo.rcvbuf_start];
                sPORTinfo.rcvbuf_start = ( sPORTinfo.rcvbuf_start + 1 ) & SBUFMSK;
                uData++;
        }
        _enable();

/* if in debug mode, display incoming data */
        if( bDebug && ( uData > 0 ) )
        {
                printf( "\ncom_read() <-- \"" );
                for( i = 0; i < uData; i++ )
                {
                        putch( cpData[i] );
                }
                printf( "\" (%u)", uData );
        }

/* return number of characters received */
        return( uData );
}

/*
*/
/* flush communication buffers */
void com_flush( void )
{
        _disable();
        sPORTinfo.rcvbuf_end = sPORTinfo.rcvbuf_start = 0;
        sPORTinfo.sndbuf_end = sPORTinfo.sndbuf_start = 0;
        _enable();
}

Page: 6
Date: 11/16/94
File: EZDATA.C
```

```c
/*
*/
int initserial(
        int iPort )             /* COM port number: 0-3 = COM 1-4 */
{
        int far * RS232_Addr;
        int       portbase;
        int       c;

/* zap PORTDATA_T structure */
        memset( &sPORTinfo, 0, sizeof(sPORTinfo) );

/* get port base */
        RS232_Addr = NULL;
        switch( iPort )
        {
        case 0:
                /* get COM1 portbase */
                _FP_SEG( RS232_Addr ) = 0x0040;
                _FP_OFF( RS232_Addr ) = 0x0000;
                break;

case 1:
                /* get COM2 portbase */
                _FP_SEG( RS232_Addr ) = 0x0040;
                _FP_OFF( RS232_Addr ) = 0x0002;
                break;

case 2:
                /* get COM3 portbase */
                _FP_SEG( RS232_Addr ) = 0x0040;
                _FP_OFF( RS232_Addr ) = 0x0004;
                break;

case 3:
                /* get COM4 portbase */
                _FP_SEG( RS232_Addr ) = 0x0040;
                _FP_OFF( RS232_Addr ) = 0x0006;
                break;
        }
        sPORTinfo.port = iPort;
        if( RS232_Addr != NULL ) sPORTinfo.portbase = *RS232_Addr;
        else return( -1 );
        portbase = sPORTinfo.portbase;
        if( portbase != 0 )
        {
                /* initialize buffer status */
                sPORTinfo.rcvbuf_end = sPORTinfo.rcvbuf_start = 0;
                sPORTinfo.sndbuf_end = sPORTinfo.sndbuf_start = 0;

/* replace hardware interrupt vector */
                if( ( sPORTinfo.port & 0x01 ) == 0 )
```

```c
        {
            /* COM1 and COM3 use IRQ4; interrupt vector 0x0C */
            sPORTinfo.oldIRQvect = _dos_getvect( 0x0C );
            _dos_setvect( 0x0C, IRQ_int );
        }
        else
        {
            /* COM2 and COM4 use IRQ3; interrupt vector 0x0B */
            sPORTinfo.oldIRQvect = _dos_getvect( 0x0B );
            _dos_setvect( 0x0B, IRQ_int );
        }
        _disable();

c = _inp( portbase + UREG_MCR ) | MCR_INT;
        _outp( portbase + UREG_MCR, c );
        _outp( portbase + UREG_IER, IER_INT );

if( sPORTinfo.port & 0x01 ) == 0 )
            c = _inp(PIC_IMR) & (IMR_IRQ4);
        else c = _inp(PIC_IMR) & (IMR_IRQ3);
        _outp(PIC_IMR, c);

_enable();

c = _inp( portbase + UREG_MCR ) | MCR_DTR | MCR_RTS;
        _outp( portbase + UREG_MCR, c );
    }
    else return( -1 );

return( 0 );
}

/*------------------------------------------------------------*/
void closeserial(void)
{
    int portbase;
    int c;

portbase = sPORTinfo.portbase;
    if( portbase != 0 )
    {
        _disable();

if( sPORTinfo.port & 0x01 ) == 0 )
        {
            /* COM1 and COM3 use IRQ4 */
            c = _inp(PIC_IMR) | IMR_IRQ4;
        }
        else
        {
            /* COM2 and COM4 use IRQ3 */
            c = _inp(PIC_IMR) | IMR_IRQ3;
        }
        _outp(PIC_IMR, c);

_outp( portbase + UREG_IER, 0);
        c = _inp( portbase + UREG_MCR ) & ~MCR_INT;
        _outp( portbase + UREG_MCR, c );

_enable();

_outp( portbase + UREG_MCR, 0 );

/* restore old hardware interrupt vector */
        if( sPORTinfo.oldIRQvect != NULL )
        {
            if( sPORTinfo.port & 0x01 ) == 0 )
            {
                /* COM1 and COM3 use IRQ4; interrupt vector 0x0C */
                _dos_setvect( 0x0C, sPORTinfo.oldIRQvect );
            }
            else
            {
                /* COM2 and COM4 use IRQ3; interrupt vector 0x0B */
                _dos_setvect( 0x0B, sPORTinfo.oldIRQvect );
            }
        }
    }
}

/*------------------------------------------------------------*/
int process_RECVQUIK(
    FILE * pFile,      /* output file pointer */
    int    iMeter )    /* meter number */
{
    char acPollStr[3];       /* string sent when polling terminal */
    char acAckStr[3];        /* string sent when retrying terminal response */
    char acAckStr[3];        /* string sent when acknowledging terminal response */
    int  iRetries;           /* number of retries */
    char acBuf[256];         /* buffer for data received */
    int  iBuf;               /* number of characters received */
    int  bDone;              /* boolean flag */
    int  iLoops;             /* loop count */
    int  i;                  /* counter/index */

/* build poll string: <addr>1<etx> */
    acPollStr[0] = (char)iMeter | 0x80;
    acPollStr[1] = CM_RECVQUIK;
    acPollStr[2] = CM_ETX;

/* build nak string: <addr><nak><etx> */
    acAckStr[0] = (char)iMeter | 0x80;
    acAckStr[1] = CM_NAK;
```

Page: 7
Date: 11/16/94
File: EZDATA.C

```c
acAckStr[2] = CH_ETX;

/* build ack string:  <addr><ack><etx> */
acAckStr[0] = (char)iMeter | 0x80;
acAckStr[1] = CH_ACK;
acAckStr[2] = CH_ETX;

iBuf = 0;
iLoops = LOOPLIMIT;
iRetries = -1;
bDone = FALSE;
while( !bDone && ( ( iRetries < RETRYLIMIT ) || ( iLoops < LOOPLIMIT ) ) )
{
    /* increment retry count approx. every second */
    if( iLoops >= LOOPLIMIT )
    {
        /* flush com buffers */
        com_flush();

/* send poll string, or nak string */
        if( iBuf > 0 ) com_write( acNakStr, 3 );
        else com_write( acPollStr, 3 );

iLoops = 0;
        iRetries++;
        iBuf = 0;
    }
    iLoops++;

/* delay for about 1/20 second */
    delay( 1 );

/* get data from com port */
    if( iBuf < sizeof(acBuf) )
    {
        iBuf += com_read( &acBuf[iBuf], sizeof(acBuf)-iBuf );
    }

/* if data is exactly 3 longer than desired, shift data */
    if( iBuf == 103 )/* 10-28-94 ERP Changed from 76 to 103 */
    {
        for( i = 0; i < 100; i++ ) /* 10-28-94 ERP Changed from 73 to 100 */
            acBuf[i] = acBuf[i+3];
        iBuf = 100; /* 10-28-94 ERP Changed from 73 to 100 */
    }

/* check data received */
    /* 10-28-94 ERP Changed   from 73 to 100 */
    if( ( iBuf == 100 ) && ( (acBuf[0] & MASK7) == (char)iMeter ) &&
        ( acBuf[1] == CH_RECVQUIK ) && ( acBuf[iBuf-1] == CH_ETX )
#ifdef CHECKSUM
        && test_checksum( acBuf, iBuf - 3 )
#endif
      )
    {
        /* write data to file */
        /* 10-28-94 ERP Added three new 9 byte fields to the file print
           string. The three at positions 70, 79, and 88 are for averages
        */
        fprintf( pFile, "\n%.2s/%.2s/%.2s\" \"%.2s:%.2s\" \"%.2s:%.2s\" "
            "%.9s %.9s %.9s %.9s %.9s %.9s %.9s %.9s\n"
            &acBuf[2],&acBuf[4],&acBuf[6],&acBuf[8],&acBuf[10],
            &acBuf[12],&acBuf[14],&acBuf[16],&acBuf[25],
            &acBuf[43],        &acBuf[52], &acBuf[61], &acBuf[70],
            &acBuf[79],        &acBuf[88] );

/* set flag */
        bDone = TRUE;
    }
    else if( ( iBuf == 3 ) && ( (acBuf[0] & MASK7) == (char)iMeter ) &&
        ( acBuf[1] == CH_CAN ) && ( acBuf[iBuf-1] == CH_ETX ) )
    {
        /* cancel communications */
        printf( "\nError: Communications cancelled by meter.\n\a" );
        return( 1 );
    }
}
if( !bDone )
{
    printf( "\nError: Communications retry limit exceeded.\n\a" );
    return( 1 );
}

/* send ack */
com_write( acAckStr, 3 );
delay( 2 );

return( 0 );    /* successful return */
}

/*
*/
int process_RECVHIST(
    FILE * pFile,       /* output file pointer */
    int    iMeter )     /* meter number */
{
    char acPollStr[3];  /* string sent when polling terminal */
    char acAckStr[3];   /* string sent when acknowledging terminal response */
    char acNakStr[3];   /* string sent when not acknowledging terminal resp */
    int  iRetries;      /* number of retries */
    char acBuf[256];    /* buffer for data received */
    int  iBuf;          /* number of characters received */
```

Page: 8
Date: 11/16/94
File: EZDATA.C

```c
    int     bDone;              /* boolean flag */
    int     iLoops;             /* loop count */
    int     bBinData;           /* boolean flag */
    int     i;                  /* counter/index */
    int     bFirstRec;          /* boolean flag */

/* build poll string: <addr><etx> */
    acPollStr[0] = (char)iMeter | 0x80;
    acPollStr[1] = CH_RECVHIST;
    acPollStr[2] = CH_ETX;

/* build ack string:  <addr><ack><etx> */
    acAckStr[0] = (char)iMeter | 0x80;
    acAckStr[1] = CH_ACK;
    acAckStr[2] = CH_ETX;

/* build nak string:  <addr><nak><etx> */
    acNakStr[0] = (char)iMeter | 0x80;
    acNakStr[1] = CH_NAK;
    acNakStr[2] = CH_ETX;

/* print quick dump header */
    /* 11-16-94 ERP Added header data for one, three and seven day averages */
    fprintf( pfile, "\"Date\" \"Time\" \"Sample Time\" "
        "\"Number of Head\" \"Total Weight\" "
        "\"Subtotal Weight\" \"Ration Total\" \"Flow Rate\" "
        "\"Bin Refill Weight\" \"One Day Avg.\" \"Three Day Avg.\" "
        "\"Seven Day Avg.\"\n" );

/* get quick dump record */
    i = process_RECVQUIK( pfile, iMeter );
    if( i != 0 ) return( i );
    delay( 2 );  /* allow time for ACK to be sent */

/* print historical data header */
    fprintf( pfile, "\n\"Date\" \"Miscellaneous\" \"Temperature\" "
        "\"Number of Head\" \"Flow Rate\" \"Total Weight\"\n" );

bDone = FALSE;
    bBinData = FALSE;
    iLoops = LOOPLIMIT;
    iBuf = 0;
    iRetries = -1;
    bFirstRec = TRUE;
    /* get historical and bin refill data */
    while( !bDone && ( ( iRetries < RETRYLIMIT ) || ( iLoops < LOOPLIMIT ) ) )
    {
        /* increment retry count approx. every second */
        if( iLoops >= LOOPLIMIT )
        {
            iLoops = 0;
            iRetries++;
            iBuf = 0;

/* flush com buffers */
            com_flush();

/* send poll string */
            if( bFirstRec ) com_write( acPollStr, 3 );
            else if( iRetries == 0 ) com_write( acAckStr, 3 );
            else com_write( acAckStr, 3 );
        }
        iLoops++;

/* delay for about 1/20 second */
        delay( 1 );

/* get data from com port */
        if( iBuf < sizeof(acBuf) )
            iBuf += com_read( &acBuf[iBuf], sizeof(acBuf)-iBuf );

/* if data is exactly 3 (longer than desired, shift data */
#if 0
        if( bFirstRec &&
            ( ( acBuf[5] == CH_HISTREC ) || ( acBuf[5] == CH_BINREC ) ) &&
            ( iBuf == 6 ) )
        {
            for( i = 0; i < 3; i++ )
                acBuf[i] = acBuf[i+3];
            iBuf = 3;
        }
        else
#endif
        if( !bBinData && ( acBuf[5] == CH_HISTREC ) && ( iBuf == 44 ) )
        {
            for( i = 0; i < 41; i++ )
                acBuf[i] = acBuf[i+3];
            iBuf = 41;
        }
        else if( ( acBuf[5] == CH_BINREC ) && ( iBuf == 24 ) )
        {
            for( i = 0; i < 21; i++ )
                acBuf[i] = acBuf[i+3];
            iBuf = 21;
        }

/* check data received */
#if 0
        if( bFirstRec && ( iBuf == 3 ) &&
            ( (acBuf[0] & MASK7) == (char)iMeter ) &&
            ( acBuf[1] == CH_RECVHIST ) && ( acBuf[2] == CH_ETX ) )
        {
            bDone = TRUE;
        }
        else
#endif
```

Page: 9
Date: 11/16/94
File: EZDATA.C

```c
        if( !bBinData && ( iBuf == 41 ) &&
            ( (acBuf[0] & MASK7) == (char)iMeter ) &&
            ( acBuf[1] == CH_RECVHIST ) && ( acBuf[2] == CH_HISTREC ) &&
            ( ( acBuf[iBuf-1] == CH_ETX ) || ( acBuf[iBuf-1] == CH_RS ) )
#ifdef CHECKSUM
            && test_checksum( acBuf, iBuf - 3 )
#endif
          )
          {
            /* save historical data */
            fprintf( pFile, "\n%.2s/%.2s/%.2s\" \"%.1s\" %.3s "
                    "%.7s %.9s %.9s\n",
                    &acBuf[3],&acBuf[5],&acBuf[7], &acBuf[9], &acBuf[10],
                    &acBuf[13], &acBuf[20], &acBuf[29] );

/* reset retries for next data */
            iRetries = -1;
            iLoops = LOOPLIMIT;

/* set flags */
            bFirstRec = FALSE;
            if( acBuf[iBuf-1] == CH_ETX ) bDone = TRUE;
          }
          else if( ( iBuf == 21 ) && ( (acBuf[0] & MASK7) == (char)iMeter ) &&
            ( acBuf[1] == CH_RECVHIST ) && ( acBuf[2] == CH_BINREC ) &&
            ( ( acBuf[iBuf-1] == CH_ETX ) || ( acBuf[iBuf-1] == CH_RS ) )
#ifdef CHECKSUM
            && test_checksum( acBuf, iBuf - 3 )
#endif
          )
          {
            if( !bBinData )
            {
              /* write column headers */
              fprintf( pFile, "\n\"Date\" \"Weight Added\"\n" );

/* set flag */
              bBinData = TRUE;
            }

/* save bin refill data */
            fprintf( pFile, "\n\"%.2s/%.2s/%.2s\" %.9s\n",
                    &acBuf[3],&acBuf[5],&acBuf[7], &acBuf[9] );

/* reset retries for next data */
            iRetries = -1;
            iLoops = LOOPLIMIT;

/* set flags */
            bFirstRec = FALSE;
            if( acBuf[iBuf-1] == CH_ETX ) bDone = TRUE;
          }
          else if( ( iBuf == 3 ) && ( (acBuf[0] & MASK7) == (char)iMeter ) &&
                   ( acBuf[1] == CH_CAN ) && ( acBuf[iBuf-1] == CH_ETX ) )
          {
            /* cancel communications */
            printf( "\nError: Communications cancelled by meter.\n\a" );
            return( 1 );
          }
        } if( !bDone )
        {
          printf( "\nError: Communications retry limit exceeded.\n\a" );
          return( 1 );
        }
        if( !bBinData )
        {
          /* write column headers */
          fprintf( pFile, "\n\"Date\" \"Weight Added\"\n" );
        }

/* send ack */
        com_write( acAckStr, 3 );
        delay( 2 );

return( 0 );     /* successful return */
}

/*
*/
int process_SENDQUIK(
    FILE    * pFile,         /* input file pointer */
    int       iMeter,        /* meter number */
    struct tm * pTm )        /* ptr to time structure */
{
    char acDataStr[256];     /* string sent to terminal */
    int  iRetries;           /* number of retries */
    char acBuf[256];         /* buffer for data from file */
    int  iBuf;               /* number of characters read from file */
    int  bDone;              /* boolean flag */
    int  iLoops;             /* loop count */
    int  i;                  /* counter/index */

/* read data from file */
    iBuf = fread( acBuf, 1, sizeof(acBuf), pFile );
    if( iBuf < 87 )
    {
        printf( "\nError: Input file is too short.\n\a" );
        return( 1 );
    }

/* build data string: <addr>3(data)<cs1><cs2><etx> */
    acDataStr[0] = (char)iMeter | 0x80;
    acDataStr[1] = CH_SENDQUIK;
    sprintf( &acDataStr[2], "%02i%02i%02i%02i%.2s%.2s%.9s%.9s%.9s"
             "%.9s%.9s", pTm->tm_mday, pTm->tm_mon+1, pTm->tm_year%100,
```

```
                pTm->tm_hour, pTm->tm_min, &acBuf[20], &acBuf[23], &acBuf[27],
                &acBuf[37], &acBuf[47], &acBuf[57], &acBuf[67], &acBuf[77] );
    acDataStr[70] = '0';
    acDataStr[71] = '0';
    strncpy( &acDataStr[70], checksum( acDataStr, 70 ), 2 );  /* add checksum */ acDataStr[72] = CH_ETX;

iBuf = 0;
    iLoops = LOOPLIMIT;
    iRetries = -1;
    bDone = FALSE;
    while( !bDone && ( ( iRetries < RETRYLIMIT ) || ( iLoops < LOOPLIMIT ) ) )
    {
        /* increment retry count approx. every second */
        if( iLoops >= LOOPLIMIT )
        {
            iLoops = 0;
            iRetries++;
            iBuf = 0;

/* flush com buffers */
            com_flush();

/* send poll string */
            com_write( acDataStr, 73 );
        }
        iLoops++;

/* delay for about 1/20 second */
        delay( 1 );

/* get data from com port */
        if( iBuf < sizeof(acBuf) )
            iBuf += com_read( &acBuf[iBuf], sizeof(acBuf)-iBuf );

/* if data is exactly 73 longer than desired, shift data */
        if( iBuf == 76 )
        {
            for( i = 0; i < 3; i++ )
                acBuf[i] = acBuf[i+73];
            iBuf = 3;
        }

/* check for acknowledgement from meter */
        if( ( iBuf == 3 ) && ( (acBuf[0] & MASK7) == (char)iMeter ) &&
            ( acBuf[1] == CH_ACK ) && ( acBuf[iBuf-1] == CH_ETX ) )
        {
            /* set flag */
            bDone = TRUE;
        }
        else if( ( iBuf == 3 ) && ( (acBuf[0] & MASK7) == (char)iMeter ) &&
            ( acBuf[1] == CH_CAN ) && ( acBuf[iBuf-1] == CH_ETX ) )
        {
            /* cancel communications */
            printf( "\nError: Communications cancelled by meter.\n\a" );
            return( 1 );
        }
    }
    if( !bDone )
    {
        printf( "\nError: Communications retry limit exceeded.\n\a" );
        return( 1 );
    } return( 0 );   /* successful return */
}

/*...........................................................*/
/* signal handler for intercepting Ctrl-C signal */
void signal_handler( int iSignal )
{
    int iSig;

/* eliminate compiler warning */
    iSig = iSignal;

/* set flag to indicate that user has interrupted program */
    bProgramAbort = TRUE;
}

/*...........................................................*/
void main( int argc, char * argv[] )
{
    int       bUsage;              /* boolean flag */
    int       iArg;                /* index/counters */
    char      acFile[30];          /* buffer for file name */
    time_t    curTime;             /* current time value */
    struct tm * pTm;               /* ptr to time structure */
    int       iPort;               /* comm port id number */
    int       iCommand;            /* command number */
    char    * cpFile;              /* ptr to file name */
    char    * cpLine;              /* ptr to line id */
    char    * cpMeter;             /* ptr to meter number */
    int       iMeter;              /* value of meter number */
    FILE    * pFile;               /* file pointer for fopen() */
#ifdef TESTCOM
    int       ch;                  /* input character */
    char      acBuf[64];           /* input buffer */
    int       iBuf;                /* input buffer data received */
    int       iWrite;              /* number of characters written */
#else
    int       iResult;             /* result of communications with meter */
#endif
```

```c
/* install signal handler for Ctrl-C */
signal( SIGINT, signal_handler );

/* print header */
printf( "\nEZDATA - Version %.10s - Consumption meter communications "
        "program.\n", VERSION );
printf( "Copyright (C) 1994, CIM Software Corporation. All rights "
        "reserved.\n\n" );

/* check command line arguments and set initial values */
bUsage   = FALSE;
iPort    = 0;
iCommand = 0;
cpFile   = NULL;
cpLine   = "";
cpMeter  = "0";
bDebug   = FALSE;
if( argc < 2 )
{
    printf( "Error: Too few command line parameters\n" );
    bUsage = TRUE;
}
else
{
    /* first argument may be either com port or command */
    iArg = 1;

/* process com port */
    if( ( stricmp( argv[iArg], "COM1"  ) == 0 ) ||
        ( stricmp( argv[iArg], "COM1D" ) == 0 ) )
    {
        iPort = 0;
        iArg++;
    }
    else if( ( stricmp( argv[iArg], "COM2"  ) == 0 ) ||
             ( stricmp( argv[iArg], "COM2D" ) == 0 ) )
    {
        iPort = 1;
        iArg++;
    }
    else if( ( stricmp( argv[iArg], "COM3"  ) == 0 ) ||
             ( stricmp( argv[iArg], "COM3D" ) == 0 ) )
    {
        iPort = 2;
        iArg++;
    }
    else if( ( stricmp( argv[iArg], "COM4"  ) == 0 ) ||
             ( stricmp( argv[iArg], "COM4D" ) == 0 ) )
    {
        iPort = 3;
        iArg++;
    } if( ( iArg > 1 ) &&
        ( ( argv[1][4] == 'D' ) || ( argv[1][4] == 'd' ) ) )
        bDebug = TRUE;

/* process command */
    if( !bUsage && ( iArg < argc ) )
    {
        if( stricmp( argv[iArg], "RECVHIST" ) == 0 )
        {
            iCommand = 1;
            iArg++;
        }
        else if( stricmp( argv[iArg], "RECVQUIK" ) == 0 )
        {
            iCommand = 2;
            iArg++;
        }
        else if( stricmp( argv[iArg], "SENDQUIK" ) == 0 )
        {
            iCommand = 3;
            iArg++;
        }
        else
        {
            printf( "Error: Unrecognized command '%.20s'\n", argv[iArg] );
            bUsage = TRUE;
        }
    }

/* if using SENDQUIK, process file name */
    if( !bUsage && ( iCommand == 3 ) )
    {
        if( iArg < argc )
        {
            cpFile = argv[iArg];
            iArg++;
        }
        else
        {
            printf( "Error: File name is required for SENDQUIK "
                    "command\n" );
            bUsage = TRUE;
        }
    }

/* if two args left, process line id */
    if( !bUsage && ( iArg < (argc-1) ) )
    {
        cpLine = argv[iArg];
        iArg++;
    }

/* process meter number */
```

Page: 12
Date: 11/16/94
File: EZDATA.C

```c
            if( !bUsage && ( iArg < argc ) )
            {
                cpMeter = argv[iArg];
                iArg++;
            }
        }

/* test command id */
        if( !bUsage && ( iCommand == 0 ) )
        {
            printf( "Error: Command not specified\n" );
            bUsage = TRUE;
        }

/* test line id */
        if( !bUsage && ( strlen( cpLine ) != 1 ) )
        {
            printf( "Error: Invalid line id (%.15s), must be one character in "
                    "length\n", cpLine );
            bUsage = TRUE;
        }

/* compute and test meter number */
        iMeter = atoi( cpMeter );
        if( !bUsage && ( ( iMeter < 0 ) || ( iMeter > 15 ) ) )
        {
            printf( "Error: Invalid meter number (%i), must be from 0-15\n",
                    iMeter );
            bUsage = TRUE;
        }

/* test for left over arguments */
        if( !bUsage && ( iArg < argc ) )
        {
            printf( "Error: Too many command line arguments\n" );
            bUsage = TRUE;
        }

/* if errors were encountered, print usage info and exit with error */
        if( bUsage )
        {
            printf("\nUsage:     EZDATA [port] <command> [file] [line] [meter]\n");
            printf("where:    [port]      is COM1, COM2, COM3, or COM4\n" );
            printf("          <command>   is RECVQUIK, RECVHIST, or SENDQUIK\n" );
            printf("          [file]      is file name (SENDQUIK command only)\n");
            printf("          [line]      is one character line id\n" );
            printf("          [meter]     is meter number (0-15)\n" );
            printf("Examples: EZDATA RECVQUIK\n" );
            printf("          EZDATA COM2 RECVHIST 2 5\n" );
            printf("          EZDATA SENDQUIK 02940825.CV1 3\n" );
            exit( 101 );
        }

/* get current date/time from PC */
        time( &curtime );
        pTm = localtime( &curtime );

/* define file name, if not already defined */
        if( cpFile == NULL )
        {
            sprintf( acFile, "%02i%02i%02i%02i.%.2s%.1s", iMeter,
                     pTm->tm_year % 100, pTm->tm_mon + 1, pTm->tm_mday,
                     (iCommand == 2) ? "HV" : "CV", cpLine );
            cpFile = acFile;
        }

/* print parameters to be used */
        printf( "%s", asctime(pTm) );
        printf( "Command:  " );
        switch( iCommand )
        {
            case 1: printf( "RECVQUIK" ); break;
            case 2: printf( "RECVHIST" ); break;
            case 3: printf( "SENDQUIK" ); break;
            default: printf( "???" );
        }
        printf( "\n" );
        printf( "File:     %s\n", cpFile );
        printf( "Port:     " );
        switch( iPort )
        {
            case 0: printf( "COM1" ); break;
            case 1: printf( "COM2" ); break;
            case 2: printf( "COM3" ); break;
            case 3: printf( "COM4" ); break;
            default: printf( "???" );
        }
        printf( "\n" );
        printf( "Line:     %s\n", cpLine );
        printf( "Meter:    %02i\n", iMeter );

/* initialize serial port */
        if( initserial( iPort ) != 0 )
        {
            printf( "\nError: Unable to install serial port services\n" );
            exit( 301 );
        }

/* set com port parameters: 9600,N,8,1 */
        com_setup();

/* determine status of file, then make sure file is opened */
        pFile = fopen( cpFile, "rt" );
```

Page: 13
Date: 11/16/94
File: EZDATA.C

```c
        if( iCommand == 3 )
        {
            if( pFile == NULL )
            {
                printf( "\nError: Could not find input file '%s'\n\a", cpFile );
                exit( 201 );
            }
        }
        else if( pFile != NULL )
        {
            printf( "\nError: Output file '%s' already exists\n\a", cpFile );
            exit( 202 );
        }
        else pFile = fopen( cpFile, "wtc" );
        if( pFile == NULL )
        {
            printf( "\nError: Unable to open file '%s'\n\a", cpFile );
            exit( 203 );
        } ifdef TESTCOM
        printf( "\nEntering terminal mode.  Press Ctrl-C to end program.\n" );
        while( !bProgramAbort )
        {
            /* check for data from serial port */
            iBuf = com_read( acBuf, sizeof(acBuf) );
            if( iBuf > 0 )
            {
                printf( "%.*s", iBuf, acBuf );
            }

/* check for keyboard input */
            iBuf = 0;
            while( ( iBuf < sizeof(acBuf) ) && kbhit() )
            {
                /* get input character */
                ch = getch();
                if( ( ch == 0 ) && kbhit() )
                {
                    /* extended key code (function keys, etc) */
                    ch = getch();
                    printf( "\nSending test string. "
                            "Press Ctrl-C to exit program.\n" );
                    con_write( "123456789-123456789-123456789-123456789-"
                               "123456789-123456789-123456789-123456789-\r\n", 82
                             );
                }
                else
                {
                    acBuf[iBuf] = (char)ch;
                    iBuf++;
                }
            } if( iBuf > 0 )
            {
                iWrite = com_write( acBuf, iBuf );
                if( iWrite == 0 )
                {
                    delay( 2 );
                    iWrite = com_write( acBuf, iBuf );
                }
                printf( "\nSending: '%.*s' (%i)\n", iBuf, acBuf, iWrite );  */
            }
        }
/*
#else
        /* process the command that was given */
        switch( iCommand )
        {
        case 1:   /* process RECVQUIK command */
            iResult = process_RECVQUIK( pFile, iMeter );
            break;

case 2:   /* process RECVHIST command */
            iResult = process_RECVHIST( pFile, iMeter );
            break;

case 3:   /* process SENDQUIK command */
            iResult = process_SENDQUIK( pFile, iMeter, pIm );
            break;

default:  /* unknown command */
            printf( "\nError: (unexpected) Unknown command.\n\a" );
            iResult = 1;
        }
endif /* close serial port */
        closeserial();

/* close file */
        fclose( pFile );

/* print message if program was aborted */
        if( bProgramAbort )
        {
            printf( "\nProgram execution cancelled by operator.\n\a" );

/* remove output file */
            if( iCommand != 3 ) remove( cpFile );

/* error exit */
            exit( 401 );
        }
#ifndef TESTCOM
        else if( iResult != 0 )
        {
```

Page: 14
Date: 11/16/94
File: EZDATA.C

```
if( iResult < 0 )
    printf( "\nError: Consumption meter data communications failed."
            "\n\n\a" );

/* remove output file */
if( iCommand != 3 ) remove( cpFile );

/* error exit */
exit( 501 );
}
endif printf( "\nDone.\n" );

/* successful exit */
exit( 0 );
}
```

Page: 15
Date: 11/16/94
File: EZDATA.C

APPENDIX 2

"EZ Consumption Meter"
Computer Program
(32 pages)

```
/* EZ.C ******************************************************
    Copyright (C) CIM Software Corporation, 1994.  All Rights Reserved.
===============================================================
              C I M   S O F T W A R E   C O R P O R A T I O N
                          5735 Lindsay Street
                        Minneapolis, Minnesota 55422
                              (612) 544-1752
===============================================================
 Developed for:
    Easy Systems Inc. Trimont, MN. (& Extron). CIM Job Number C94-617
 ...............................................................
 Description:
    This is the control program for a consumption meter used for monitoring
    hog feeding. The program reads input from a 16 key keypad and displays
    output on a bank of seven seven-segment displays.

CIM Project Number: C94-617

Extron software part number: A0045R01
 ...............................................................
 Revision History:
    Eric Peterson, CIM Software Corporation              - 04/01/94
    Initial Version (1.0)
 ...............................................................
 Compile Options Used:
    This program is compiled using the Avocet Hi-Tech C compiler for the
    Motorola 6811 microcontroller. The following command line was used:

c68 -Gez.sym -ll -Oez.hex -Mez.map -V -A8000,100,400,0 -CRez.crf ez.c

This program was debugged using the Cactus Logic Target Interface Unit
    emulator and the Integrated Development System. When appropriate the
    CPUP unit was used to test the actual hardware. In order to use this
    emulator the .sym file generated by the compiler is converted to a .CLD
    file. The translator program supplied by Cactus Logic was used
    with the following syntax:

avhm6811 ez.hex /A=8000

***************************************************************/ include "EZDEF.H"   /* program constant definitions */
include "EZMAIN.H"  /* main include file */
include "EZ.H"      /* this program's include file */

/****************************************************************
 Local: void main( void )
```

/*****************************************************************
 Description: The main routine controls the timing of the display updating
              and servicing of the keypad. Main also checks for when it is
              appropriate to increment the feed total.

Set up 50ms or less timer. This will be used to control the program
              flow. Program flow consists of updating the display with the
   new/current
              value, scanning the keypad for user input, debouncing the keypad input
              if there is any, and processing the keypad input which may include
   updating
              the display. Current display value must be kept in a static variable. The
   and
              the last keypress value must be kept in a static variable. The
   keypress
              must be checked incase the operator is holding the key down. In
   certain
              cases holding the key down should not cause any processing, but in
   other
              cases it will affect the processing.
 *****************************************************************/
void main( void )
{
    unsigned char ucKey_Pressed,
                  ucPrev_Key_Pressed,
                  bKeypress_Valid,
                  bFunction_Key,
                  bKey_Up,
                  ucCur_Key,
                  ucPrev_Function,
                  bCalculate_Averages = 1,
                  ucCur_Function = 0;

short sNum_Decimals = 0,
          sCur_Time_Cnt = 0,
          sClear_Count = 0;

float fCurrent_Val = 0.0;

Initialize_Program(); /* set the timer and all ports to initial values */
    SCSR = 0x00; /* clear the flags from SCI register */ while(1) /* set up continuous loop for processing */
    {
        /* Update the Display */
        if( bDisplay_Timer_Expired )
        {
            di();
            Display_Counter( fCurrent_Val, sNum_Decimals );
            ei();
        }

/* Flow Totalizing */
```

```c
/* if the motor is running and the 1 second timer has expired then
   increment total */
if(( PORTE & MOTOR_RUN )&&( viRTIcount >= 60 )) /* is motor running? */
{
    viRTIcount = 0L;
    /* WEIGHT_CONVERSION_FACTOR comes from the RTI clock rate * number
       of counts / 60 sec per minute */
    fTotal_Lbs += fFlow_Rate * WEIGHT_CONVERSION_FACTOR;
    fSub_Total += fFlow_Rate * WEIGHT_CONVERSION_FACTOR;
    fRation_Total -= fFlow_Rate * WEIGHT_CONVERSION_FACTOR;
    fBin_Weight -= fFlow_Rate * WEIGHT_CONVERSION_FACTOR;
}
else if( !(PORTE & MOTOR_RUN))
{
    viRTIcount = 0L;
}

/* Keypad scanning */
if( bKeypad_Timer_Expired )
{
    dlf();
    Get_Button_Val( &ucKey_Pressed ); /* get the button value */
    if( ucKey_Pressed == ucCur_Key )
    {
        bKey_Up = 0;
        if( ucKey_Pressed == CLEAR )
        {
            sClear_Count++;
        }
    }
    else
    {
        bKey_Up = 1;
    }
    ucCur_Key = ucKey_Pressed;

if((( ucKey_Pressed == TOTAL_WEIGHT )||
        ( ucKey_Pressed == SUB_TOTAL )||
        ( ucKey_Pressed == RATION_TOTAL )||
        ( ucKey_Pressed == DAILY_AVE )||
        ( ucKey_Pressed == SEVEN_DAY_AVE )||
        ( ucKey_Pressed == FOURTEEN_DAY_AVE )||
        ( ucKey_Pressed == SET )|| /* not implemented */
        ( ucKey_Pressed == DATE_TIME )||
        ( ucKey_Pressed == CAL_LOAD_CELL )||
        ( ucKey_Pressed == SAMPLE_TIME )||
        ( ucKey_Pressed == NUM_HEAD )||
        ( ucKey_Pressed == FLOW_RATE )||
        ( ucKey_Pressed == BIN_REFILL ))&& bkey_up )||
        ( ucKey_Pressed == INCREMENT )||
        ( ucKey_Pressed == CLEAR )||
        ( ucKey_Pressed == DECREMENT ))
    {
        bKeypress_Valid = 1;

if(( ucKey_Pressed != CLEAR )&&
           ( ucKey_Pressed != INCREMENT )&&
           ( ucKey_Pressed != DECREMENT ))
        {
            bFunction_Key = 1;
        }
        else
        {
            bFunction_Key = 0;
            if( ucKey_Pressed == CLEAR )
            {
                if( sClear_Count >= 40 )
                {
                    bClear = 1;
                    bKeypress_Valid = 1;
                    sClear_Count = 0;
                }
                else
                {
                    bClear = 0;
                    bKeypress_Valid = 0;
                }
            }
        }
    }
    else
    {
        bKeypress_Valid = 0;
        bFunction_Key = 0;

sIncrement_Count = 0;
        sDecrement_Count = 0;

sClear_Count = 0;
    } if( bFunction_Key )
    {
        if(( ucKey_Pressed != ucPrev_Key_Pressed )||
           ( ucKey_Pressed == DATE_TIME )||
           ( ucKey_Pressed == SAMPLE_TIME ))
        {
            ucPrev_Function = ucCur_Function;
            sIncrement_Count = 0;
            sDecrement_Count = 0;
        }
        ucCur_Function = ucKey_Pressed;
```

Page: 2
File: EZ.C
Date: November 16, 1994

```c
                                                                    bCalculate_Averages = 0;
  selected */         /* reset the bin refill weight change if different function
                      if(( ucPrev_function == BIN_REFILL )&&
                         ( ucCur_Function != BIN_REFILL ))                          else
                      {                                                             {
                         fWeight_Change = 0.0;                                          bCalculate_Averages = 1;
                      }                                                             }
                      if(( bKeypress_Valid )||                                      sCur_Time_Cnt = 0; /* reset counter */
                         ((ucCur_Function == DATE_TIME )||
                          ( ucCur_Function == DAILY_AVE )||                   } /* end while(1) */
                          ( ucCur_Function == SEVEN_DAY_AVE )||          } /* end main() */
                          ( ucCur_Function == FOURTEEN_DAY_AVE )||
                          ( ucCur_Function == FLOW_RATE ))&&            /*****************************************************
                          sCur_Time_Cnt%300 == 0 ))||                    Local: void Initialize_Program( void )
                         ((ucCur_Function == TOTAL_WEIGHT )||
                          ( ucCur_Function == SUB_TOTAL )||              Description: This function sets the initial values in the
                          ( ucCur_Function == RATION_TOTAL )||                        configuration registers, RTI rate, and RTI
                          ( ucCur_Function == BIN_REFILL ))&&                         enable.
                          sCur_Time_Cnt%20 == 0 )))
                      {                                                 *****************************************************/
                         fCurrent_Val = Process_Keypress( ucKey_Pressed,
                                                          ucCur_Function,           void Initialize_Program( void )
  ucPrev_Key_Pressed,                                                               {
  ucPrev_function,                                  &sNum_Decimals );                  di(); /* disable maskable interrupts */ ucPrev_Key_Pressed = ucKey_Pressed;                           ROM_VECTOR( RTI_VEC, Real_Time ); /* set the vector for the RTI */
                      }
                      ucKey_Pressed = 0;                                               ROM_VECTOR( TOC2_VEC, Display_Timer ); /* set the vector for the output
                      sCur_Time_Cnt++; /* increment timer for getting current time */                                                       compare timer #2 (Display) */
                      ei();
                   } /* end if keypad timer expired */                                 ROM_VECTOR( TOC3_VEC, Keypad_Timer ); /* set the vector for the output
                   if( sCur_Time_Cnt >= 1200 ) /* at 50ms keypad scan rate this gives 1                                                  compare timer #3 (Keypad) */
  minute */
                   {                                                                   ROM_VECTOR( SCI_VEC, Process_Serial_Port ); /* set the vector for the
                      Read_Clock( );                                       serial                                                    communications interface interrupt
                      /* calculate the averages if current time equals the sa.. ..:.    */
                      if(( sCur_Time.ucHours == sSample_Time.ucHour ) 
                      {                                                                HPRIO &= 0xF6; /* test - set SCI system interrupts to highest priority */
                         if(( sCur_Time.ucMinutes >= sSample_Time.ucMinutes )&&
  bCalculate_Averages )                                                                ucOut_Data = 0; /* test for serial port */
                         {                                                             ucIn_Data = 0; /* test for serial port */
                            Save_Data(); /* save the current feed fed data to NVRAM */ sOP = 0; /* test for serial port */
                            Calculate_Averages(); /* calculate new daily, etc. averages sBP = 0;
  */
                                                                                        PACTL = RTI_RATE | PORTA_7_OUT; /* set the RTI rate and Port A bit 7 to
                                                                                    output */

DDRD = 0x04; /* enable PD2 as output */
                                                                                        PORTD = 0x04; /* clear PD2 - set for transmit */

Page: 3
  File: EZ.C
  Date: November 16, 1994
```

```c
    SCCR1 = 0x08;  /* start bit, 8 data bits, 1 stop bit, address mark wake up
                    */
    SCCR2 = TRANSMIT_ENABLE;  /* SCI transmitter enabled */
    BAUD = BAUD_RATE;  /* SCI baud rate set to 9600 */ ucl_Done = 0;  /* transmission not done */
    memset( ucOut_Text, '\0', MAX_IO );  /* set output character string to null */
    memset( ucIn_Text, '\0', MAX_IO );   /* set input character string to null */

TOC2 = DISPLAY_TIMER_RATE;  /* timer output compare 2 used for display
                                   updates */

TOC3 = KEYPAD_TIMER_RATE;   /* timer output compare 3 used for keypad reads
                                   */

TMSK1 = OTC_INT_ENAB;  /* enable interrupts for output timer compare
                              registers 2 and 3 */

TFLG1 = 0x40;  /* clear the output compare 2 interrupt flag */
    TFLG1 = 0x20;  /* clear the output compare 3 interrupt flag */
    CONFIG = 0x0C;  /* disable all internal ROM and EPROM */ ucDIP_Switch = DIPSWITCH;  /* read the DIP switch settings */
    ucAddress = (( ucDIP_Switch & 0xF0 ) >> 4 ) | 0x80;  /* mask off the address
                                                           setting */

/* set initial values for global static variables */
    ssCount_Motor = 0;
    ssCount_Ration = 0;
    ssDecimal_Points = -1;
    sfDisplay_Val = -1.0;
    ssTime_Cnt = 0;
    ssSample_Time_Cnt = 0;
    bCclear = 0;

/* clear the data index pointer if invalid or switch 6 on the DIP switch is
       set */
    if(( sData_Index < 0 )||( sData_Index > MAX_RECORDS )||( ucDIP_Switch &
        0x04 ))
    {
        sData_Index = 0;
    }

/* clear the flow index pointer if invalid or switch 6 on the DIP switch is
       set */
    if(( sFlow_Index < 0 )||( sFlow_Index > MAX_RECORDS )||( ucDIP_Switch &
        0x04 ))
    {
        sFlow_Index = 0;
    } if(( sBin_Index < 0 )||( sBin_Index > MAX_BIN_REC )||( ucDIP_Switch & 0x04
        ))
    {
        sBin_Index = 0;
    } if( ucDIP_Switch & 0x08 )  /* if DIP position 5 is set, clear all */
    {                          /* this is needed only for testing with 11UP */
        fTotal_Lbs = 0.0;
        fSub_Total = 0.0;
        fRation_Total = 0.0;
        fBin_Weight = 0.0;
        fDaily_Ave = 0.0;
        fThree_Day_Ave = 0.0;
        fSeven_Day_Ave = 0.0;
        fNum_Head = 0.0;
        fFlow_Rate = 0.0;
        sFlow_Index = 0;
        sData_Index = 0;
        sBin_Index = 0;
        sSample_Time.ucHours = 0;
        sSample_Time.ucMinutes = 0;
    } if(( sFlow_Index == 0 )&&( sData_Index == 0 ))
    {
        Read_Clock();  /* get the current date and time */
        sData[ 0 ].ucDay = sCur_Time.ucDate;
        sData[ 0 ].ucMonth = sCur_Time.ucMonth;
        sData[ 0 ].ucYear = sCur_Time.ucYear;
        sData[ 0 ].ucMisc = 0;
        sData[ 0 ].sNum_Head = 0;
        sData[ 0 ].fTotal_Lbs = 0.0;
        sData[ 0 ].fFlow_Rate = 0.0;
        sData[ 0 ].ucTemperature = 0;
        sFlow_Index++;
        sData_Index++;
    }

TMSK2 |= RTI_ENABLE;     /* enable the RTI */
    TFLG2 = RTI_FLAG_CLEAR;  /* clear the RTI flag */ ei();  /* enable maskable interrupts */
}  /* end Initialize_Program() */

/*****************************************************************************
Local: void Display_Update( float *, short )

Description: This function contains the processing that occurs
             when the display needs to be updated. The value passed
             to this function in float is the value to be displayed.
*****************************************************************************/
```

Page: 4
File: EZ.C
Date: November 16, 1994

```c
/****************************************************************/
void Display_Update( float fDisplay_Val, short sDecimal_Points )
{
short i, j;
    sDec_Val;

unsigned char ucDigit;

static unsigned char bNegative,
                     sOutput_Val[ NUM_DIGITS ];

long lTemp;

static short sCalc = 0;

static long lVal;

bDisplay_Timer_Expired = 0; /* Reset Display Timer Flag bit */ if(( fDisplay_Val != sfDisplay_Val )||( sDecimal_Points != ssDecimal_Points
)||( sCalc != 0 ))
{
    switch( sCalc )
    {
    case 0:
        sfDisplay_Val = fDisplay_Val;
        ssDecimal_Points = sDecimal_Points;

for( i = 0; i < NUM_DIGITS; i++ )
        {
            sOutput_Val[i] = 10;
        } switch( sDecimal_Points )
        {
        case 0:
            sDec_Val = 1;
            break;
        case 1:
            sDec_Val = 10;
            break;
        case 2:
            sDec_Val = 100;
            break;
        default:
            sDec_Val = 1;
            break;
        } lTemp = (long)( sfDisplay_Val * sDec_Val );

/* determine if displayed number is negative */
        if(( lTemp < 0L )
        {
            bNegative = 1;
            lTemp = -lTemp;
        }
        else
        {
            bNegative = 0;
        } lVal = lTemp;

for( i = 0; i < 3; i++ )
        {
            sOutput_Val[i] = (unsigned char)( lVal % 10L );
            lVal /= 10L;

if(( lVal == 0L )&&( i >= sDecimal_Points ))
            {
                sCalc = -1;
                break;
            }
            else if(( lVal == 0L )&&( sDecimal_Points < 0 ))
            {
                sCalc = -1;
                break;
            }
        }
        sCalc++;
        break;
    case 1:
        for( i = 3; i < 5; i++ )
        {
            sOutput_Val[i] = (unsigned char)( lVal % 10L );
            lVal /= 10L;

if(( lVal == 0L )&&( i >= sDecimal_Points ))
            {
                sCalc = -1;
                break;
            }
            else if(( lVal == 0L )&&( sDecimal_Points < 0 ))
            {
                sCalc = -1;
                break;
            }
        }
        sCalc++;
        break;
```

Page: 5
File: EZ.C
Date: November 16, 1994

```c
            case 2:
                for( i = 5; i < NUM_DIGITS; i++ )
                {
                    sOutput_Val[i] = (unsigned char)( lval % 10L );
                    lval /= 10L;

if(( lval == 0L )&&( i >= sDecimal_Points ))
                    {
                        break;
                    }
                    else if(( lval == 0L )&&( sDecimal_Points < 0 ))
                    {
                        break;
                    }
                }
                sCalc = 0;
                break;
        } /* end switch */ if( sCalc == 0 )
        {
            /* write seven digits out to the display */
            for( i = 0; i < NUM_DIGITS; i++ ) /* NUM_DIGITS = 7 */
            {
                /* determine value to display */
                if( sDecimal_Points == -1 ) /* display time value */
                {
                    if( i < NUM_DIGITS - 4 )
                    {
                        sOut_Val[i] = BLANK;
                    }
                    else
                    {
                        sOut_Val[i] = nlook_up[ sOutput_Val[ i -( NUM_DIGITS - 4
                    }
                }
                else if( sDecimal_Points == -2 ) /* Display hour in 12 hour format
                */
                {
                    if( i == 0 )
                    {
                        if( lTemp < 12 )
                        {
                            sOut_Val[0] = 0x77; /* Display "A" */
                        }
                        else
                        {
                            lTemp -= 12;
                            sOutput_Val[0] = lTemp % 10;
                            sOutput_Val[1] = ( lTemp / 10 ) ? ( lTemp / 10L ) : 10;
                            sOut_Val[0] = 0x73; /* Display "P" */
                        }
                        if( lTemp == 0 )
                        {
                            sOut_Val[1] = nlook_up[ 2 ];
                            sOut_Val[2] = nlook_up[ 1 ];
                            i = 2;
                        }
                        else
                        {
                            sOut_Val[1] = nlook_up[ sOutput_Val[0]];
                            sOut_Val[2] = nlook_up[ sOutput_Val[1]];
                            i = 2;
                        }
                    }
                    else
                    {
                        sOut_Val[i] = 0x00; /* blank out the rest */
                    }
                }
                else if( sDecimal_Points == -10 ) /* display text */
                {
                    sOut_Val[i] = nlook_up[ sOutput_Val[i] + 10 ];
                }
                else /* display any other value */
                {
                    sOut_Val[i] = nlook_up[ sOutput_Val[i] ];
                    if( bNegative && ( sOutput_Val[i] == 10 ))
                    {
                        sOut_Val[i] = NEGATIVE;
                        bNegative = 0;
                    }
                }
            }
        }

/* blink the right hand decimal point to show ration total is negative */
        if(( fRation_Total < 0.0 )&&( ssCount_Ration > BLINK_INTERVAL ))
        {
            sbRH_Decimal_Point = 0x01;
            ssCount_Ration = 0;
        }
        else if( fRation_Total >= 0.0 )
        {
            sbRH_Decimal_Point = 0;
            ssCount_Ration = 0;
        }
        ssCount_Ration++; /* increment ration total status counter */

/* blink the Left Hand decimal point to show motor is running */
        if(( PORTE & MOTOR_RUN )&&( ssCount_Motor > BLINK_INTERVAL ))
        {
```

Page: 6
File: EZ.C
Date: November 16, 1994

```c
        sbLH_Decimal_Point |= 0x01;
        ssCount_Motor = 0;
    }
    else if( !(PORTE & MOTOR_RUN ))
    {
        sbLH_Decimal_Point = 0;
        ssCount_Motor = 0;
    }
    ssCount_Motor++;   /* increment motor status counter */ for( i = 0; i < NUM_DIGITS; i++ )
    {
        /* Output the correct bit seqeuce to the display */
        if((( i == 0 )&&( sbLH_Decimal_Point ))||
           (( i == NUM_DIGITS - 1 )&&( sbLH_Decimal_Point ))||
           (( i != 0 )&&( i == sDecimal_Points )))
        {
            DISPLAY_VAL = sOut_Val[ i ] | DECIMAL_POINT;
        }
        else if(( sDecimal_Points == -1 )&&(( i == NUM_DIGITS-2 )||( i ==
NUM_DIGITS-3 )))
        {
            DISPLAY_VAL = sOut_Val[ i ] | DECIMAL_POINT;
        }
        else
        {
            DISPLAY_VAL = sOut_Val[ i ];
        }
        ucDigit = ~( 0x01 << i );
        DIGIT_SEL = ucDigit;  /* select the correct digit */ for( j = 0; j < 50; j++ );  /* keep on for small time */

DISPLAY_VAL = 0x00;  /* turn off digit */
        DIGIT_SEL = 0xff;    /* deselect all digits */
    }
}  /* end Display_Update() */

/*******************************************************************
Local: void Calculate_Averages( void )

Description: This function will recalculate the daily average, 7 day
             average, and the 14 day average at the appropriate
             time interval.
*******************************************************************/
void Calculate_Averages( void )
{
    float fTemp,
          fAve = 0.0;
```

Page: 7
File: EZ.C
Date: November 16, 1994

```c
    short sAve_Cnt = 0,
          i, j,
          sIndex,
          sCur_Day;

/* get the current sData array index */
    sIndex = sData_Index;

/* fetch yesterdays data and calculate the current days average */
    for( i = 2; (( sIndex - i ) >= 0 )&&
               ( sData[sIndex - i].ucDay == sData[sIndex-1].ucDay ); i++ );

if((( sIndex - i ) > -1 )&&
       ( sData[sIndex - 1].fTotal_Lbs > sData[sIndex-i].fTotal_Lbs ))
    {
        fDaily_Ave = ( sData[sIndex-1].fTotal_Lbs - sData[sIndex-i].fTotal_Lbs )
                   / ((float)sData[sIndex-1].sNum_Head);
    }
    else if(( sIndex-i < 0 )||
            ( sData[sIndex-1].fTotal_Lbs < sData[sIndex-i].fTotal_Lbs / ((float)sData[sIndex-1].sNum_Head))
    {
        fDaily_Ave = 0.0;
    }
    else
    {
        fDaily_Ave = 0.0;
    }

/* calculate the Three day average */
    for( j = 2; ((sIndex - j ) >= 0 )&&
               (sData[sIndex - j].ucDay == sData[ sIndex - 1 ].ucDay ); j++ );
    sCur_Day = 1;

for( i = 0; ( i < 3 )&&(( sIndex-sCur_Day ) >= 0 )&&( sCur_Day > 0 ); i++ )
    {
        fTemp = 0.0;
        if(( sIndex-j >= 0 )&&
           ( sData[sIndex-sCur_Day].fTotal_Lbs >= sData[sIndex-j].fTotal_Lbs - sData[sIndex-
j].fTotal_Lbs ))
        {
            fTemp = sData[sIndex-sCur_Day].fTotal_Lbs - sData[sIndex-j].fTotal_Lbs;
        }
        else if(( sIndex-j < 0 )||( sData[sIndex-sCur_Day].fTotal_Lbs <
sData[sIndex-j].fTotal_Lbs ))
        {
            fTemp = sData[sIndex-sCur_Day].fTotal_Lbs;
        }
        if( fTemp > 0.0 )
        {
            sAve_Cnt++;
```

```
                                    fAve += ( fTemp / (float)sData[sIndex-sCur_Day].sNum_Head );
                                }
                                sCur_Day = j;
                                j++;
                            }
                            for( ; (( sIndex - j ) >= 0 )&&
                                    ( sData[ sIndex - j ].ucDay == sData[ sIndex - sCur_Day ].ucDay
                                ); ) ++j;
                        }
                        fThree_Day_Ave = (sAve_Cnt > 0) ? (fAve / ((float)sAve_Cnt) : fDaily_Ave;

/* calculate the Seven day average */
                        sAve_Cnt = 0;
                        fAve = 0.0;

for( j = 2; (( sIndex - j ) >= 0 )&&
                                ( sData[sIndex - j].ucDay == sData[sIndex - 1].ucDay ); j++ );
                        sCur_Day = 1;

for( i = 0; ( i < 7 )&&(( sIndex-sCur_Day ) >= 0 )&&( sCur_Day > 0 ); i++ )
                        {
                            fTemp = 0.0;
                            if(( sIndex-j ) >= 0 )&&( sData[sIndex-sCur_Day].fTotal_Lbs >=
                sData[sIndex-j].fTotal_Lbs ))
                            {
                                fTemp = sData[sIndex-sCur_Day].fTotal_Lbs - sData[sIndex-
                j].fTotal_Lbs;
                            }
                            else if(( sIndex-j < 0 )||( sData[sIndex-sCur_Day].fTotal_Lbs <
                sData[sIndex-j].fTotal_Lbs ))
                            {
                                fTemp = sData[sIndex-sCur_Day].fTotal_Lbs;
                            }
                            if( fTemp > 0.0 )
                            {
                                fAve += ( fTemp / (float)sData[sIndex-sCur_Day].sNum_Head );
                                sAve_Cnt++;
                            }
                            sCur_Day = j;
                            j++;
                        }
                        for( ; (( sIndex - j ) >= 0 )&&
                                ( sData[ sIndex - j ].ucDay == sData[ sIndex - sCur_Day ].ucDay
                            ); ) j++;
                    }
                    fSeven_Day_Ave = (sAve_Cnt > 0) ? (fAve / (float)sAve_Cnt) : fDaily_Ave;
                } /* end Calculate_Averages() */
/*****************************************************************************
|   Local: Recalculate_Flow( void )
|------------------------------------------------------------------------------
|   Description:
|       This function will recalculate the flow rates and flow totals since
|       the last time a calibration was run.
\*****************************************************************************/
void Recalculate_Flow( void )
{
    short i;

float fOld_Tot,
          fNew_Tot,
          fDaily_Tot,
          fOld_Flow,
          fTemp,
          fDiff;

/***** CALCULATE THE NEW FLOW RATE *****/
    /* difference in current total lbs and total when last calibrated */
    fDiff = ( fBin_Weight - fCal_Bin_Weight );

/* difference divided by total feed consumed in period gives
       multiplying factor */
    fTemp = fDiff / (( fTotal_Lbs - sData[ sFlow_Index - 1 ].fTotal_Lbs ) +
fDiff );

/* new flow rate calc'd from multiplicitive factor times old flow
       rate plus old flow rate */
    fOld_Flow = fFlow_Rate;
    fFlow_Rate = fFlow_Rate + ( fFlow_Rate * fTemp );

/* calculate new Total, Sub Total, Ration Total, and Bin Weight */
    fTotal_Lbs += fDiff;
    fSub_Total *= fFlow_Rate;
    fSub_Total /= fOld_Flow;
    fRation_Total += fDiff;
    fBin_Weight = fCal_Bin_Weight;

/***** CALCULATE THE NEW FEED FED VALUES *****/
    fOld_Tot = sData[ sFlow_Index - 1 ].fTotal_Lbs;

for( i = sFlow_Index; i < sData_Index; i++ )
    {
        if(( sData[ i ].fTotal_Lbs > 0.0 )
        {
            if(( sData[ i ].fTotal_Lbs >= fOld_Tot )&&( fOld_Tot > 0.0 ))
            {
                fDaily_Tot = sData[ i ].fTotal_Lbs - fOld_Tot;
                fNew_Tot = sData[ i - 1 ].fTotal_Lbs;
            }
            else
            {
                fDaily_Tot = sData[ i ].fTotal_Lbs;
```

Page: 8
File: EZ.C
Date: November 16, 1994

```c
            fNew_Tot = 0.0;

fDaily_Tot /= sData[ i ].fFlow_Rate;

/* calculate new flow rate for feed fed data */
        sData[ i ].fFlow_Rate = sData[ i ].fFlow_Rate + ( sData[ i
].fFlow_Rate * fTemp );

fDaily_Tot *= sData[i].fFlow_Rate;

fOld_Tot = sData[ i ].fTotal_Lbs;

sData[ i ].fTotal_Lbs = fNew_Tot + fDaily_Tot;

sData[ i ].ucMisc = 1; /* set to 1 = has been calibrated */
    } sFlow_Index = sData_Index; /* store new flow recalc array index */

Calculate_Averages( ); /* recalculate the averages after the flow rate
                              and the totals have been changed. This w:!!
                              make the display of averages be correct for
                              the new flow rate. */

} /* end Recalculate_Flow() */

/****************************************************************
|   Function: Save_Data( SAVED_DATA *sNew_Data )
|
|   Description: Saves the data to the NVRAM and updates the pointers.
|                If the data array is full the data is adjusted back one
|                and the oldest piece of data is dropped off.
****************************************************************/
void Save_Data( void )
{
    short sIndex, i;
    SAVED_DATA sNew_Data;

/* save the current information to the NVRAM */
    sNew_Data.ucDay = sCur_Time.ucDate;
    sNew_Data.ucMonth = sCur_Time.ucMonth;
    sNew_Data.ucYear = sCur_Time.ucYear;
    sNew_Data.ucMisc = 0; /* 0 indicates has not been calibrated */
    sNew_Data.sNum_Head = (short)fNum_Head;
    sNew_Data.fTotal_Lbs = fTotal_Lbs;
    sNew_Data.fFlow_Rate = fFlow_Rate;
    sNew_Data.ucTemperature = 0;

/* get the current sData array index */
    sIndex = sData_Index;

if( sIndex >= MAX_RECORDS )
    {
        /* drop off oldest data and shift all the data back one location */
        for( i = 1; i < MAX_RECORDS; i++ )
        {
            memcpy( &sData[i-1], &sData[i], sizeof( SAVED_DATA ));
        }
        sIndex--;
        sFlow_Index -= 1;
    } memcpy( &sData[ sIndex ], &sNew_Data, sizeof( SAVED_DATA ));

sIndex++; /* increment the NVRAM array index */
    sData_Index = sIndex; /* save the new NVRAM array index */
} /* end Save_Data */

/****************************************************************
|   Function: Process_Serial_Port( void )
|
|   Description: Processes serial port flags.
****************************************************************/
void interrupt Process_Serial_Port( void )
{
    vucSerial_State = SCSR; /* read the SCSR register for status */ if(( vucSerial_State & TDRE )&&
       ( SCCR2 == TRANSMIT_ENABLE )&&
       ( !ucI_Done ))
    {
        /* Transmit Data Register Empty */
        if(( ucOut_Data < MAX_IO )&&( ucOut_Text[ ucOut_Data ] != '\0' ))
        {
            SCDR = *(ucOut_Text + ucOut_Data);

ucOut_Data++;
        }
        else
        {
            ucI_Done = 1;
        } vucSerial_State = 0;
    }
    else if(( vucSerial_State & TC )&&( SCCR2 == TRANSMIT_ENABLE ))
    {
        /* Transmit of one record complete */
        PORTD = 0x00; /* set PD2 to 0 to enable receive on chip */
        SCCR2 = RECEIVE_WAKE;

ucOut_Data = 0;
```

Page: 9
File: EZ.C
Date: November 16, 1994

```c
            vucSerial_State = 0;
        }
        else if( vucSerial_State & OR )
        {
            /* Overrun Error */
            while(( vucSerial_State & OR )||
                  ( vucSerial_State & RDRF ))  /* clear the receive register */
            {
                *ucIn_Text = SCDR;  /* should clear OR */
                vucSerial_State = SCSR;  /* read the SCSR register for status */
                for( ucIn_Data = 0; ucIn_Data < 50; ucIn_Data += 2 )
                {
                    ucIn_Data++;
                }
            } memset( ucOut_Text, '\0', MAX_IO );

*ucOut_Text  = ucAddress;
            *(ucOut_Text+1) = NAK;
            *(ucOut_Text+2) = ETX;

ucT_Done = 0;
            ucCommand = 0;
            ucIn_Data = 0;
            bAddress_OK = FALSE;

PORTD = 0x04; /* set PD2 to 1 to enable send on chip */
            SCCR2 = TRANSMIT_ENABLE;
            vucSerial_State = 0;
        }
        else if(( vucSerial_State & RDRF )&&
                ( SCCR2 == RECEIVE_WAKE ))&& !bAddress_OK )
        {
            *ucIn_Text = SCDR;  /* should clear OR */
        }
        else if(( vucSerial_State & RDRF )&&
                ( SCCR2 == RECEIVE_ENABLE ))&& !bAddress_OK )
        {
            /* Receive Data Register Full */
            *(ucIn_Text + ucIn_Data) = SCDR;

/* determine if data is addressed for this meter */
            if( *ucIn_Text == ucAddress )
            {
                bAddress_OK = TRUE;  /* address matched, start to receive */
                ucIn_Data = 1;
            }
            else
            {
                ucIn_Data = 0;
                bAddress_OK = FALSE;
            }
        }
        else if(( vucSerial_State & RDRF )&&
                ( SCCR2 == RECEIVE_ENABLE ))&& bAddress_OK )
        {
            /* Receive Data Register Full */
            *(ucIn_Text + ucIn_Data) = SCDR;

if(( *(ucIn_Text + ucIn_Data) != ETX )&&
               ( ucIn_Data < (unsigned char)MAX_IO ))  /* check for end of transmission */
            {
                ucIn_Data++;
            }
            else
            {
                if( ucCommand == 0 )
                {
                    ucCommand = *(ucIn_Text + 1);
                } switch( ucCommand )
                {
                    /* process message */
                    case '1':
                        if( *(ucIn_Text+1) == ACK )
                        {
                            ucCommand = 0;
                            ucT_Done = 0;
                            /* set RWU bit to disable receive operation until next wake up */
                            PORTD = 0x00; /* set PD2 to 0 to enable receive on chip */

SCCR2 = RECEIVE_WAKE;
                        }
                        else if( *(ucIn_Text+1) == ucCommand )
                        {
                            /* send Quick Dump data */
                            memset( ucOut_Text, '\0', MAX_IO );

*ucOut_Text = ucAddress;
                            *(ucOut_Text+1) = '1';

ieform( ucOut_Text+2,  sCur_Time.ucMonth, 2 );
                            ieform( ucOut_Text+4,  sCur_Time.ucDate, 2 );
                            ieform( ucOut_Text+6,  sCur_Time.ucYear, 2 );
                            ieform( ucOut_Text+8,  sCur_Time.ucHours, 2 );
                            ieform( ucOut_Text+10, sCur_Time.ucMinutes, 2 );
                            ieform( ucOut_Text+12, sSample_Time.ucHours, 2 );
                            ieform( ucOut_Text+14, sSample_Time.ucMinutes, 2 );
```

Page: 10
File: EZ.C
Date: November 16, 1994

```c
              fform( ucOut_Text+16, fHir_Head, 9 );
              fform( ucOut_Text+25, fTotal_Lbs, 9 );
              fform( ucOut_Text+34, fSub_Total, 9 );
              fform( ucOut_Text+43, fRation_Total, 9 );
              fform( ucOut_Text+52, fFlow_Rate, 9 );
              fform( ucOut_Text+61, fBin_Weight, 9 );
              fform( ucOut_Text+70, fDaily_Ave, 9 );
              fform( ucOut_Text+79, fThree_Day_Ave, 9 );
              fform( ucOut_Text+88, fSeven_Day_Ave, 9 );

checksum( ucOut_Text, 97 );
              *(ucOut_Text+97) = *acChkSum;
              *(ucOut_Text+98) = *(acChkSum+1);
              *(ucOut_Text+99) = ETX;

ucT_Done = 0;
              PORTD = 0x04;  /* set PD2 to 1 to enable send on chip */
              SCCR2 = TRANSMIT_ENABLE;
            }
            else
            {
              if( ucRetries > 3 )
              {
                ucCommand = 0;
                ucRetries = 0;
                memset( ucOut_Text, '\0', MAX_IO );
                *ucOut_Text = ucAddress;
                *(ucOut_Text+1) = CAN;
                *(ucOut_Text+2) = ETX;
              }
              ucRetries++;
              ucT_Done = 0;
              PORTD = 0x04;  /* set PD2 to 1 to enable send on chip */
              SCCR2 = TRANSMIT_ENABLE;
            }
            break;

case '2':    /* send Complete Dump data */
            if( *(ucIn_Text+1) == ACK )
            {
              if( sDP < sData_Index )
              {
                sDP++;
              }
              else if( sBP < sBin_Index )
              {
                sBP++;
              }
            } if((( *(ucIn_Text+1) == ACK )||( *(ucIn_Text+1) == ucCommand
               )) && 
               (( sDP < sData_Index )||( sBP < sBin_Index )))
            {
              memset( ucOut_Text, '\0', MAX_IO );

if( sDP < sData_Index )
              {
                *ucOut_Text = ucAddress;
                *(ucOut_Text+1) = '2';
                *(ucOut_Text+2) = 'H';

ieform( ucOut_Text+3,  sData[sDP].ucMonth, 2 );
                ieform( ucOut_Text+5,  sData[sDP].ucDay, 2 );
                ieform( ucOut_Text+7,  sData[sDP].ucYear, 2 );
                ieform( ucOut_Text+9,  sData[sDP].ucMisc, 1 );
                ieform( ucOut_Text+10, sData[sDP].ucTemperature, 3 );
                ieform( ucOut_Text+13, sData[sDP].sNum_Head, 7 );

fform( ucOut_Text+20, sData[sDP].fFlow_Rate, 9 );
                fform( ucOut_Text+29, sData[sDP].fTotal_Lbs, 9 );

checksum( ucOut_Text, 38 );
                *(ucOut_Text+38) = *acChkSum;
                *(ucOut_Text+39) = *(acChkSum+1);
                *(ucOut_Text+40) = RS;
              }
              else if( sBP < sBin_Index )
              {
                *ucOut_Text = ucAddress;
                *(ucOut_Text+1) = '2';
                *(ucOut_Text+2) = 'B';

ieform( ucOut_Text+3, sBin_Wt[sBP].ucMonth, 2 );
                ieform( ucOut_Text+5, sBin_Wt[sBP].ucDay, 2 );
                ieform( ucOut_Text+7, sBin_Wt[sBP].ucYear, 2 );

fform( ucOut_Text+9, sBin_Wt[sBP].fBin_Wt_Added, 9 );

checksum( ucOut_Text, 18 );
                *(ucOut_Text+18) = *acChkSum;
                *(ucOut_Text+19) = *(acChkSum+1);

if( sBP < ( sBin_Index - 1 ))
                {
                  *(ucOut_Text+20) = RS;
                }
                else
                {
                  *(ucOut_Text+20) = ETX;
                }
              }
              ucT_Done = 0;
```

```c
            PORTD = 0x04;  /* set PD2 to 1 to enable send on chip */
            SCCR2 = TRANSMIT_ENABLE;
         }
         else if(( *(ucIn_Text+1) == ACK )&&
                ( sDP >= sData_Index )&&
                ( sBP >= sBin_Index ))
         {
            ucCommand = 0;
            sDP = 0;
            sBP = 0;
            /* set RMU bit to disable receive operation until next wake up */
            PORTD = 0x00;  /* set PD2 to 0 to enable receive on chip */

SCCR2 = RECEIVE_WAKE;
         }
         else
         {
            if(( ucRetries > 3 ))
            {
               ucCommand = 0;
               ucRetries = 0;
               memset( ucOut_Text, '\0', MAX_IO );
               *ucOut_Text = ucAddress;
               *(ucOut_Text+1) = CAN;
               *(ucOut_Text+2) = ETX;
               sDP = 0;
               sBP = 0;
            }
            ucRetries++;
            ucT_Done = 0;
            PORTD = 0x04;  /* set PD2 to 1 to enable send on chip */
            SCCR2 = TRANSMIT_ENABLE;
         }
         break;

case '3':
         /* receive current parameters */
         memset( ucOut_Text, '\0', MAX_IO );

checksum( ucIn_Text, 70 );

if( memcmp( ucIn_Text+70, acChkSum, 2 ) == 0 )
         {
            /* received data is OK */
            memcpy( ucOut_Text, ucIn_Text+2, 2 );
            sCur_Time.ucMonth = (unsigned char )atoi( ucOut_Text );
            memcpy( ucOut_Text, ucIn_Text+4, 2 );
            sCur_Time.ucDate = (unsigned char )atoi( ucOut_Text );
            memcpy( ucOut_Text, ucIn_Text+6, 2 );
            sCur_Time.ucYear = (unsigned char )atoi( ucOut_Text );
            memcpy( ucOut_Text, ucIn_Text+8, 2 );
            sCur_Time.ucHours = (unsigned char )atoi( ucOut_Text );
            memcpy( ucOut_Text, ucIn_Text+10, 2 );
            sCur_Time.ucMinutes = (unsigned char )atoi( ucOut_Text );

memcpy( ucOut_Text, ucIn_Text+12, 2 );
            sSample_Time.ucHours = (unsigned char )atoi( ucOut_Text );
            memcpy( ucOut_Text, ucIn_Text+14, 2 );
            sSample_Time.ucMinutes = (unsigned char )atoi( ucOut_Text );

memcpy( ucOut_Text, ucIn_Text+16, 9 );
            fNum_Head = atof( ucOut_Text );
            memcpy( ucOut_Text, ucIn_Text+25, 9 );
            fTotal_Lbs = atof( ucOut_Text );
            memcpy( ucOut_Text, ucIn_Text+34, 9 );
            fSub_Total = atof( ucOut_Text );
            memcpy( ucOut_Text, ucIn_Text+43, 9 );
            fRation_Total = atof( ucOut_Text );
            memcpy( ucOut_Text, ucIn_Text+52, 9 );
            fFlow_Rate = atof( ucOut_Text );
            memcpy( ucOut_Text, ucIn_Text+61, 9 );
            fBin_Weight = atof( ucOut_Text );

Write_Clock();

memset( ucOut_Text, '\0', MAX_IO );

*(ucOut_Text+1) = ACK;
         }
         else
         {
            *(ucOut_Text+1) = NAK;
         }
         *ucOut_Text = ucAddress;
         *(ucOut_Text+2) = ETX;

ucT_Done = 0;
         ucCommand = 0;
         PORTD = 0x04;  /* set PD2 to 1 to enable send on chip */
         SCCR2 = TRANSMIT_ENABLE;

break;

default:
         /* send NAK if unknown command */
         memset( ucOut_Text, '\0', MAX_IO );

*ucOut_Text = ucAddress;
         *(ucOut_Text+1) = NAK;
         *(ucOut_Text+2) = ETX;

ucT_Done = 0;
         ucCommand = 0;
         PORTD = 0x04;  /* set PD2 to 1 to enable send on chip */
```

```
            SCCR2 = TRANSMIT_ENABLE;

break;
        }
        bAddress_OK = FALSE;
        ucIn_Data = 0;
        memset( ucIn_Text, '\0', MAX_IO );
    }
    vucSerial_State = 0;
}
else if( vucSerial_State & IDLE )
{
    /* Idle-Line Detect */
    vucSerial_State = 0;
}
} /* end Process_Serial_Port */
```

Page: 13
File: F.Z.C
Date: November 16, 1994

```c
/*****************************************************************
Copyright (C) CIM Software Corporation, 1994.  All Rights Reserved.
=================================================================
         C I M   S O F T W A R E   C O R P O R A T I O N
                     5735 Lindsay Street
                   Minneapolis, Minnesota 55422
                         (612) 544-1752
=================================================================
Developed for:
   Easy Systems Inc. Trimont, MN. (& Extron). CIM Job Number C94-617
-----------------------------------------------------------------
Description:
   This is the include file for the Motorola 6811 Port Definitions.
   This include file assumes that the ports ar at starting address 1000H.
-----------------------------------------------------------------
Revision History:
   Eric Peterson, CIM Software Corporation             - 04/01/94
   Initial Version <1.0>
*****************************************************************/ volatile unsigned char PORTA   @ 0x1000;  /* Port A Data */
volatile unsigned char PIOC    @ 0x1002;  /* Parallel I/O Control Register */
volatile unsigned char PORTC   @ 0x1003;  /* Port C Data */
volatile unsigned char PORTB   @ 0x1004;  /* Port B Data */
volatile unsigned char PORTCL  @ 0x1005;  /* Port C Latched */
volatile unsigned char DDRC    @ 0x1007;  /* Port C Data Direction Register */
volatile unsigned char PORTD   @ 0x1008;  /* Port D Data */
volatile unsigned char DDRD    @ 0x1009;  /* Port D Data Direction Register */
volatile unsigned char PORTE   @ 0x100A;  /* Port E Data */
volatile unsigned char CFORC   @ 0x100B;  /* Timer Compare Force */
volatile unsigned char OC1M    @ 0x100C;  /* Output Compare 1 Mask */
volatile unsigned char OC1D    @ 0x100D;  /* Output Compare 1 Data */
volatile unsigned short TCNT   @ 0x100E;  /* High order byte of free running 16 bit timer */
volatile unsigned short TIC1   @ 0x1010;  /* Timer 1 input compare high byte */
volatile unsigned short TIC2   @ 0x1012;  /* Timer 2 input compare high byte */
volatile unsigned short TIC3   @ 0x1014;  /* Timer 3 input compare high byte */
volatile unsigned short TOC1   @ 0x1016;  /* Timer 1 Output Compare high byte */
volatile unsigned short TOC2   @ 0x1018;  /* Timer 2 Output Compare high byte */
volatile unsigned short TOC3   @ 0x101A;  /* Timer 3 Output Compare high byte */
volatile unsigned short TOC4   @ 0x101C;  /* Timer 4 Output Compare high byte */
volatile unsigned short TI4O5  @ 0x101E;  /* Timer 5 Input/Output Compare high byte */
volatile unsigned char TCTL1   @ 0x1020;  /* Timer Control Register 1 */
volatile unsigned char TCTL2   @ 0x1021;  /* Timer Control Register 2 */
volatile unsigned char TMSK1   @ 0x1022;  /* Timer Interrupt Mask Register 1 */
volatile unsigned char TFLG1   @ 0x1023;  /* Timer Interrupt Flag 1 */
volatile unsigned char TMSK2   @ 0x1024;  /* Timer interrupt mask register 2 */
volatile unsigned char TFLG2   @ 0x1025;  /* Timer interrupt flag register 2 */
volatile unsigned char PACTL   @ 0x1026;  /* Pulse Accumulator Control */
volatile unsigned char PACNT   @ 0x1027;  /* Pulse Accumulator Count Register */
volatile unsigned char SPCR    @ 0x1028;  /* Serial Peripheral Control Register */
volatile unsigned char SPSR    @ 0x1029;  /* Serial Peripheral Status Register */
volatile unsigned char SPDR    @ 0x102A;  /* SPI Data Register */
volatile unsigned char BAUD    @ 0x102B;  /* Baud Rate Register */
volatile unsigned char SCCR1   @ 0x102C;  /* SCI Control Register 1 */
volatile unsigned char SCCR2   @ 0x102D;  /* SCI Control Register 2 */
volatile unsigned char SCSR    @ 0x102E;  /* SCI Status Register */
volatile unsigned char SDR     @ 0x102F;  /* SCI data register */
volatile unsigned char ADCTL   @ 0x1030;  /* A/D Control/Status Register */
volatile unsigned char ADR1    @ 0x1031;  /* A/D Converter Result Register 1 */
volatile unsigned char ADR2    @ 0x1032;  /* A/D Converter Result Register 2 */
volatile unsigned char ADR3    @ 0x1033;  /* A/D Converter Result Register 3 */
volatile unsigned char ADR4    @ 0x1034;  /* A/D Converter Result Register 4 */
volatile unsigned char BPROT   @ 0x1035;  /* Block Protect */
volatile unsigned char OPTION  @ 0x1039;  /* Options Control Register */
volatile unsigned char COPRST  @ 0x103A;  /* Arm/Reset COP Timer Circuitry */
volatile unsigned char PPROG   @ 0x103B;  /* EPROM and EEPROM Programming Control */
volatile unsigned char HPRIO   @ 0x103C;  /* Highest Priority I-Bit Interrupt and Misc */
volatile unsigned char INIT    @ 0x103D;  /* RAM and I/O Mapping Register */
volatile unsigned char CONFIG  @ 0x103F;  /* Configuration Control Register */

/* set addresses for memory mapped devices */
volatile unsigned char DISPLAY_VAL @ 0x1FFE;  /* write display value for selected digits*/
volatile unsigned char DIGIT_SEL   @ 0x1FFF;  /* seven segment display digits */
volatile unsigned char DIPSWITCH   @ 0x1FFF;  /* bank of 8 dip switches */
```

Page: 1
Date: 11/16/94
File: 6811PORT.H

```c
/* EZMAIN.H ***************************************************************
   Copyright (C) CIM Software Corporation, 1994.  All Rights Reserved.
   =======================================================================
                    C I M   S O F T W A R E   C O R P O R A T I O N
                                5735 Lindsey Street
                             Minneapolis, Minnesota 55422
                                   (612) 544-1752
   =======================================================================
   Developed for:
   Easy Systems Inc. Trimont, MN. (& Extron). CIM Job Number C94-617
   -----------------------------------------------------------------------
   Description:
     This is the include file for the EZ programs.
   -----------------------------------------------------------------------
   Revision History:
   Eric Peterson, CIM Software Corporation              - 04/01/94
   Initial Version (1.0)
   ***************************************************************** */

/*************************************************************************\
|  INCLUDE FILES                                                          |
\*************************************************************************/ include "6811PORT.H"    /* variable definitions for all 6811 internal register
*/
include <68HC11.H>      /* definitions of ... */
include <INTRPT.H>      /* interrupt vector definitions */
include <MATH.H>        /* needed for math function definitions */
include <STRING.H>      /* for memcpy, memset functions */
include <STDLIB.H>      /* for atoi */

/*************************************************************************\
|  GLOBAL VARIABLES                                                       |
\*************************************************************************/

/**** TYPEDEFS FOR NEW TYPES AND STRUCTURES ****/

/* typedef unsigned size_t; */ /* type returned from sizeof */ typedef struct{
  unsigned char ucMinutes;
  unsigned char ucHours;
  unsigned char ucDate;
  unsigned char ucMonth;
  unsigned char ucYear; /* SIZE: 5 bytes */
} sCUR_TIME;

typedef struct{
  unsigned char ucDay;
  unsigned char ucMonth;
  unsigned char ucYear;
  unsigned char ucMisc;
  short sNum_Head;
  float fTotal_Lbs;
  float fFlow_Rate;
  unsigned char ucTemperature;
}SAVED_DATA; /* SIZE: 15 bytes */ typedef struct{
  unsigned char ucDay;
  unsigned char ucMonth;
  unsigned char ucYear;
  float fBin_Wt_Added;
  float fBin_Wt; /* SIZE: 7 bytes */
}SAVE_BIN_WT;

/**** MEMORY CONSTANTS ****/

/* this array is the look up alpha numeric characters for output to the 7
   segment displays */
/*
          0 , 1 , 2 , 3 , 4 ,
          5 , 6 , 7 , 8 , 9 ,
          blnk, A , d , E , H ,
          n , o                               */
const unsigned char nlook_up[18] = ( 0x3F, 0x06, 0x5B, 0x4F, 0x66,
                                     0x6D, 0x7D, 0x07, 0x7F, 0x67,
                                     0x00, 0x77, 0x5E, 0x79, 0x76,
                                     0x54, 0x5C, 0x40 );

/* max days in months for numbers 1 - 12 */
const unsigned char ucMax_Month[13] = ( 0, 31, 29, 31, 30, 31, 30, 31, 31, 30,
                                        31, 30, 31 );

/**** GLOBAL VARIABLES IN PROCESSOR RAM ****/ volatile unsigned char bDisplay_Timer_Expired;  /* Set to 1 when Display Timer
expires */
volatile unsigned char bKeypad_Timer_Expired;   /* Set to 1 when Keypad Timer
expires */
volatile unsigned char vucSerial_State; /* state of SCI interrupt */
volatile unsigned char ucOut_Data;      /* output data counter */
volatile unsigned char ucT_Done;        /* flag for transmit done */
volatile unsigned char ucIn_Data;       /* input data counter */
volatile unsigned char ucChar_Count;    /* character count from sprintf */
volatile unsigned char ucCommand;       /* command received from SCI system */
volatile char acChkSum[2];              /* static buffer for checksum characters */
```

```c
volatile short vIRTIcount; /* Real Time Interrupt counter */
volatile short sDP;  /* historical data dump pointer (counter) */
volatile short sBP;  /* bin weight data dump pointer (counter) */ short sIncrement_Count,
      sDecrement_Count,
      sDecimal_Points;

sCUR_TIME sCur_Time; /* current time of day */ float sfDisplay_Val,  /* holds the value of the last(or currently) displayed
                         value */
      fCal_Bin_Weight, /* holds the value for the actual bin weight - operator
                         entered */
      fNew_Flow_Rate, /* value for when flow rate is being changed */
      fWeight_Change; /* amount of bin weight change */ unsigned char sbRH_Decimal_Point,  /* 1 = blink right hand decimal point, 0
= off */
              sbLH_Decimal_Point,  /* 1 = blink left hand decimal point, 0 =
off */
              sOut_Val[ NUM_DIGITS ], /* bit string of last (or currently)
displayed value, use for fast output */
              bClear,          /* 1 = "clear" button was pressed, 0 =
"clear" button not pressed */
              ucDIP_Switch,    /* current DIP switch settings read out
of reset */
              ucAddress,       /* address of this meter */
              bAddress_OK,     /* flag to signal received address match
*/
              bAdd_Bin_Weight, /* flag to signal bin weight added */
              bNew_Flow_Rate,  /* flag to signal flow rate changed */
              ucRetries,       /* number of retries for transmission */
              ssCount_Motor,
              ssCount_Ration,
              ssTime_Cnt,
              ssSample_Time_Cnt,
              ssCalibrate_Cnt;

/*******************************************************
**** GLOBAL VARIABLES IN NON-VOLATILE RAM ****
*******************************************************/
volatile float fTotal_Lbs        @ 0x2001;
volatile float fSub_Total        @ 0x2005;
volatile float fFlow_Rate        @ 0x2009;
volatile float fRation_Total     @ 0x200D;
volatile float fBin_Weight       @ 0x2011;
volatile float fDaily_Ave        @ 0x2015;
volatile float fThree_Day_Ave    @ 0x2019;
volatile float fSeven_Day_Ave    @ 0x201D;
volatile float fNum_Head         @ 0x2021;

volatile sCUR_TIME sSample_Time  @ 0x2025; /* time of day when average
                                              calculations to occur */
volatile short sFlow_Index       @ 0x202A; /* location to save the array index of the
                                              last record for which a flow
                                              recalculation
                                              was done */
volatile short sData_Index       @ 0x202C; /* location to save the current sData
                                              array index */
volatile short sBin_Index        @ 0x202E; /* location to save the current sBin_Wt
                                              array index */
volatile SAVED_DATA sData[MAX_RECORDS] @ 0x2030; /* array of SAVED_DATA
                                                    structures
                                                    to be held in NVRAM */
volatile SAVE_BIN_WT sBin_Wt[MAX_BIN_REC] @ 0x37A0; /* array of SAVE_BIN_WT
                                                       structures */
volatile unsigned char ucOut_Text[ MAX_IO ] @ 0x3F00; /* text data for output
                                                         to serial port */
volatile unsigned char ucIn_Text[ MAX_IO ] @ 0x3F80; /* text data for input
                                                        from serial port */

Page: 2
Date: 11/16/94
File: EZMAIN.H
```

```
/* EZDEF.H ************************************************************
Copyright (C) CIM Software Corporation, 1994. All Rights Reserved.
=======================================================================
                    C I M   S O F T W A R E   C O R P O R A T I O N
                              5735 Lindsay Street
                            Minneapolis, Minnesota 55422
                                  (612) 544-1752
=======================================================================
Developed for:
    Easy Systems Inc, Trimont, MN. (& Extron). CIM Job Number C94-617

Description:
    This is the global constant definition include file for the EZ programs.

Revision History:
    Eric Peterson, CIM Software Corporation          - 04/01/94
    Initial Version (1.0)

**********************************************************************/

/**********************************************************************
        GLOBAL MACRO DEFINES
**********************************************************************/
define FALSE         0
define TRUE          (!FALSE)

define NUM_DIGITS    7          /* number of digits that can be displayed */ define LED_DIGIT_SELECT  0x80   /* value to be output to port A to enable the LED chip select */ define DECIMAL_POINT     0x80   /* seven segment display notation of a decimal point */ define NEGATIVE          0x40   /* display degative sign on seven segment display */
define BLANK             0x00   /* display a blank on seven seg disp */ define WEIGHT_CONVERSION_FACTOR 16.384e-3   /* conversion factor to convert from lbs/min flow rate to
                                                lbs/x counts flow rate.  The
equation for this is:
                                                RTI clock rate * Number of
counts / 60 sec per min *                       conversion factor. In our case
the values are:
                                                RTI clock rate = 16.384ms
                                                Number of counts = 60
                                                                                      these numbers yield the above
                                                conversion factor */ define NUM_ROWS      4          /* number of rows in the keypad */ define NO_HEAD       5604312    /* value that displays "no HEAd" */

/* keypad button decode values */
define TOTAL_WEIGHT      0x11   /* Row 1, Column 1 */
define SUB_TOTAL         0x21   /* Row 1, Column 2 */
define RATION_TOTAL      0x41   /* Row 1, Column 3 */
define INCREMENT         0x81   /* Row 1, Column 4 */
define DAILY_AVE         0x12   /* Row 2, Column 1 */
define SEVEN_DAY_AVE     0x22   /* Row 2, Column 2 */
define FOURTEEN_DAY_AVE  0x42   /* Row 2, Column 3 */
define DECREMENT         0x82   /* Row 2, Column 4 */
define SET               0x14   /* Row 3, Column 1 */
define DATE_TIME         0x24   /* Row 3, Column 2 */
define CAL_LOAD_CELL     0x44   /* Row 3, Column 3 */
define SAMPLE_TIME       0x84   /* Row 3, Column 4 */
define NUM_HEAD          0x18   /* Row 4, Column 1 */
define CLEAR             0x28   /* Row 4, Column 2 */
define FLOW_RATE         0x48   /* Row 4, Column 3 */
define BIN_REFILL        0x88   /* Row 4, Column 4 */ define RTI_ENABLE        0x40   /* RTI enable bit in TMSK2 register */
define RTI_RATE          0x02   /* RTI rate set to 16.384ms */
define RTI_FLAG_CLEAR    0x40   /* RTI flag register clear bit */ define PORTA_7_OUT       0x80   /* Set Port A bit 7 to Output */
define OTC_INT_ENAB      0x60   /* Enable Output compare interrupts for OC2 and OC3 */
define COMP_TIMER_RATE   0x02   /* Compare Timer Rate set to 4.0us per count */ define DISPLAY_TIMER_RATE  0x09C4  /* Display update rate set to 2,500 counts,
                                       using a 4us timer = 10ms */
define KEYPAD_TIMER_RATE   0x3004  /* Keypad update rate set to 12,500 counts,
                                       using a 4us timer = 50ms */
/* #define KEYPAD_TIMER_RATE 0x1388 */ /* test */ define BLINK_INTERVAL    50     /* blink rate for status decimal points */ define MOTOR_RUN         0x20   /* bit in port E showing motor run status */ define INC_RATE          8      /* rate for how fast values will increment or decrement */
/* #define INC_RATE        1 */   /* test */
define MAX_RECORDS       400    /* maximum number of records to store in NVRAM */
```

Page: 1
Date: 11/16/94
File: EZDEF.H

```
define MAX_BIN_REC                250    /* maximum number of bin weight records
to store in NVRAM */

/*************************
**** SCI System ****
*************************/ define TDRE                0x80  /* Transmit data register empty */
define TC                  0x40  /* Transmit complete */
define RDRF                0x20  /* Receive data register full */
define IDLE                0x10  /* Idle-Line Detect */
define OR                  0x08  /* Overrun Error */
define NF                  0x04  /* Noise Flag */
define FE                  0x02  /* Framing Error */
define TRANSMIT_ENABLE     0x88  /* Enable Transmitter for SCI */
define RECEIVE_ENABLE      0x24  /* Enable Reciever for SCI */
define RECEIVE_WAKE        0x26  /* Enable Receiver for SCI, and wake up function
*/
define BAUD_RATE           0x33  /* Baud Rate for SCI = 300 */
define MAX_IO              128   /* max buffer space for 10 strings */
define STX                 0x02  /* start of transmission */
define ETX                 0x03  /* end of transmission */
define ACK                 0x06  /* acknowledge response */
define NAK                 0x07  /* negative acknowledgement */
define CAN                 0x18  /* cancel */
define RS                  0x1E  /* record separator */
```

Page: 2
Date: 11/16/94
File: EZDEF.H

```
/* EZ2.H ********************************************************

Copyright (C) CIM Software Corporation, 19..., All Rights Reserved.

================================================================
           C I M   S O F T W A R E   C O R P O R A T I O N
                        5735 Lindsay Street
                      Minneapolis, Minnesota 55422
                           (612) 544-1752
================================================================
Developed for:
   Easy Systems Inc. Trimont, MN. (& Extron). CIM Job Number C94-617
------------------------------------------------------------------
Description:
   This is the include file for EZ2.C Revision History:
   Eric Peterson, CIM Software Corporation          - 04/01/94
   Initial Version (1.0)
*******************************************************************/

/*****************************************************************
                    FUNCTION DECLARATIONS
*****************************************************************/
void    Inc_Dec_Value( unsigned char, float *, short *, unsigned char );
void    interrupt Real_Time( void );
void    interrupt Display_Timer( void );
void    interrupt Keypad_Timer( void );
void    interrupt Serial_Comm( void );
void    Get_Button_Val( unsigned char * );
void    Phantom_Clock_Pattern( void );
void    Read_Clock( void );
void    Write_Clock( void );
void    convert_Time( unsigned char * );
unsigned char hexdigit( unsigned );
void    checksum( unsigned char *, int );
int     test_checksum( char *, int );

void    fform( char *, double, int );
void    ieform( char *, int, int );

float   Process_Keypress( unsigned char, unsigned char, unsigned char, unsigned char, unsigned char, unsigned char, unsigned char, unsigned char, unsigned char, unsigned char, unsigned char, short* );

extern void    Recalculate_Flow( void );
extern void    Save_Data( void );

/********************
 * STRUCTURE DEFINITIONS *
 ********************/
typedef struct{
    unsigned char ucMinutes;
    unsigned char ucHours;
    unsigned char ucDate;
    unsigned char ucMonth;
    unsigned char ucYear;
} sCUR_TIME; /* SIZE: 5 bytes */ typedef struct{
    unsigned char ucDay;
    unsigned char ucMonth;
    unsigned char ucYear;
    float fBin_Wt_Added;
}SAVE_BIN_WT; /* SIZE: 7 bytes */

/*****************************************************************
 * EXTERNAL GLOBAL VARABLE REFERENCES - DEFINED IN EZMAIN.H *
 *****************************************************************/
extern volatile unsigned char PORTE;     /* Port E Data */
extern volatile unsigned short TOC2;     /* Timer 2 Output Compare high byte */
extern volatile unsigned short TOC3;     /* Timer 3 Output Compare high byte */
extern volatile unsigned char TFLG1;     /* Timer Interrupt flag 1 */
extern volatile unsigned char TFLG2;     /* Timer interrupt flag register 2 */
extern volatile unsigned char SCSR;      /* SCI Status Register */
extern volatile unsigned char bDisplay_Timer_Expired;  /* Set to 1 when Display
Timer expires */
extern extern volatile unsigned char bKeypad_Timer_Expired;  /* Set to 1 when
Keypad Timer expires */
extern volatile unsigned char ucSerial_State; /* state of SCI interrupt */
extern volatile char acChkSum[2];        /* static buffer for checksum characters */
extern volatile short vIRTIcount;        /* Real Time Interrupt counter */
extern short sIncrement_Count,
             sDecrement_Count;
extern sCUR_TIME sCur_Time;  /* current time of day */
/* max days in months for numbers 1 - 12 */
extern unsigned char ucMax_Month[13];
extern float sfDisplay_Val,  /* holds the value of the last(or currently)
displayed value */
         fCal_Bin_Weight, /* holds the value for the actual bin weight -
operator entered */

Page: 1
Date: 11/16/94
File: EZ2.H
```

```
                    fNew_Flow_Rate,   /* value for when flow rate is being changed */
                    fWeight_Change;   /* amount of bin weight change */ extern unsigned char bClear,                        /* 1 = "clear" button was pressed,
        0 = "clear" button not pressed */
                    bAdd_Bin_Weight,                /* flag to signal bin weight added */
                    bNew_Flow_Rate,                 /* flag to signal flow rate changed */
                    sTime_Cnt,
                    sSample_Time_Cnt,
                    ssCalibrate_Cnt;

extern volatile float fTotal_Lbs;
extern volatile float fSub_Total;
extern volatile float fFlow_Rate;
extern volatile float fRation_Total;
extern volatile float fBin_Weight;
extern volatile float fDaily_Ave;
extern volatile float fThree_Day_Ave;
extern volatile float fSeven_Day_Ave;
extern volatile float fNum_Head;

extern volatile sCUR_TIME sSample_Time;  /* time of day when average
                                            calculations to occur */
extern volatile short sBin_Index;        /* location to save the current sBin_Wt
                                            array index */
extern volatile SAVE_BIN_WT sBin_Wt[MAX_BIN_REC]; /* array of SAVE_BIN_WT
structures                                          to be held in NVRAM */

/********************************************
 * LOCAL GLOBAL VARIABLE DEFINITIONS *
 ********************************************/
volatile unsigned char KEYPAD_ROW @ 0x1FFE;    /* select keypad row to scan */
volatile unsigned char PHANTOM_JUNK_REGISTER @ 0x2000;  /* junk register in 8k
        RAM address space for reading and writing the phantom clock */

/* bit sequence for pattern recognition in the Phantom clock */
const unsigned char ucP_Clock[8] = { 0xC5, 0x3A, 0xA3, 0x5C, 0xC5, 0x3A, 0xA3,
0x5C };

const char acMap[] = "0123456789ABCDEF";
```

Page: 2
Date: 11/16/94
File: EZ2.H

```
pragma psect text=text2
/* EZ2.C ****************************************************************
 Copyright (C) CIM Software Corporation, 1994.  All Rights Reserved.
======================================================================
              C I M   S O F T W A R E   C O R P O R A T I O N
                         5735 Lindsay Street
                       Minneapolis, Minnesota 55422
                              (612) 544-1752
======================================================================
Developed for:
   Easy Systems Inc. Trimont, MN. (& Extron). CIM Job Number C94-617
--------------------------------------------------------------------
Description:
   This program contains functions used by the EZ.C program.

CIM Project Number: C94-617

Extron software part number: A0045R01

Revision History:
   Eric Peterson, CIM Software Corporation           - 04/01/94
   Initial Version (1.0)
--------------------------------------------------------------------
Compile Options Used:
   This program is compiled using the Avocet Hi-Tech C compiler for the
   Motorola 6811 microcontroller.  The following command line was used:

c68 -Oez.sym -ll -Oez.hex -Mez.map -V -A8000,100,400,0 -CRez.crf ez.c

This program was debugged using the Cactus Logic Target Interface Unit
   emulator and the Integrated Development System.  When appropriate the
   CPUP unit was used to test the actual hardware.  In order to use this
   emulator the .sym file generated by the compiler is converted to a .CLD
   file.  The translator program supplied by Cactus logic was used
   with the following syntax:

avhm6811 ez.hex /A=8000
*************************************************************************/ include "EZDEF.H"    /* program constatne definitions */
include "EZ2.H"      /* this program's include file */
include <STRING.H>   /* for memcpy, memset functions */
include <MATH.H>     /* needed for math function definitions */

/***********************************************************************
 Local: void Phantom_Clock_Pattern( void )

Description: This function established the pattern recognition
              sequence with the phantom clock.  A serial bit pattern
              on DQ0 of 64 bits must be written to the chip in order
              to establish communication with the phantom clock.
              Once the pattern is recognized, the next 64 reads or
              writes are used to serially read or write to the clock.
***********************************************************************/
void Phantom_Clock_Pattern( void )
{
   short i,
         j;

unsigned char ucTemp;

ucTemp = PHANTOM_JUNK_REGISTER;  /* issue 1 read to start pattern
recognition */ for( i = 0; i < 8; i++ )
   {
      for( j = 0; j < 8; j++ )
      {
         PHANTOM_JUNK_REGISTER = ucP_Clock[ i ] >> j;
      }
   }
} /* end Phantom_Clock_Pattern() */

/***********************************************************************
 Local: void Read_Clock( void )

Description: This function reads the information from the phantom
              clock.
***********************************************************************/
void Read_Clock( void )
{
   unsigned char ucTemp, ucTemp1, PM;

unsigned char ucTime_Date[8]; /* array used to hold information being read
from or                             written to the Phantom clock.  Format is as
follows:
                                     sTime[0] = sub seconds
                                     sTime[1] = seconds
                                     sTime[2] = minutes
                                     sTime[3] = hours & am/pm & 12/24
                                     sTime[4] = day & control OSC & RST
                                     sTime[5] = date
                                     sTime[6] = month
                                     sTime[7] = year */ short i;
```

```c
    };

Phantom_Clock_Pattern();

for( i = 0; i < 8; i++ )
    {
        ucTemp = 0;
        for( j = 0; j < 8; j++ )
        {
            ucTemp1 = PHANTOM_JUNK_REGISTER;
            ucTemp |= ( ucTemp1 << j );
        }
        ucTime_Date(i) = ucTemp;
    }

PM = ( ucTime_Date(3) & 0x20 ) ? 1 : 0;

sCur_Time.ucMinutes = (ucTime_Date(2) & 0x0F)+(( ucTime_Date(2) >> 4 )*10);
    sCur_Time.ucHours = (ucTime_Date(3) & 0x0F)+((ucTime_Date(3) & 0x30) >> 4 )*10);
    sCur_Time.ucDate = (ucTime_Date(5) & 0x0F)+(( ucTime_Date(5) >> 4 )*10);
    sCur_Time.ucMonth = (ucTime_Date(6) & 0x0F)+(( ucTime_Date(6) >> 4 )*10);
    sCur_Time.ucYear = (ucTime_Date(7) & 0x0F)+(( ucTime_Date(7) >> 4 )*10);
} /* end Read_Clock() */

/***************************************************************
    Local: void Write_Clock( void )

Description: This function reads the information from the phantom
                 clock.
***************************************************************/
void Write_Clock( void )
{
    short i;
    j;
    unsigned char ucTemp_Time;
    unsigned char ucOut_Time(8);

Phantom_Clock_Pattern();
    Convert_Time( ucOut_Time );

for( i = 0; i < 8; i++ )
    {
        ucTemp_Time = *( ucOut_Time + i );
        for( j = 0; j < 8; j++ )
        {
            PHANTOM_JUNK_REGISTER = ( ucTemp_Time >> j );
        }
    }
}

Page:2
Date: 11/16/94
File: E22.C
```

```c
} /* end Write_Clock */

/***************************************************************
    Local: void Convert_Time( unsigned char * )

Description: This function converts the time in the sCUR_TIME
                 structure to a format compatible with the Phantom
                 clock array. This is where control bits are
                 set determining if the clock operates in 12 or 24
                 hour format, whether to enable the RESET input pin,
                 and whether to enable the oscillator which enables
                 the watch.
***************************************************************/
void Convert_Time( unsigned char *sPhantom_Time )
{
    sPhantom_Time[0] = 0; /* .1 and .01 seconds = 0 */ sPhantom_Time[1] = 0; /* 10 and 1 seconds = 0 */ sPhantom_Time[2] = (((sCur_Time.ucMinutes / 10) << 4 ) +
(sCur_Time.ucMinutes % 10));

sPhantom_Time[3] = ((sCur_Time.ucHours / 10) << 4) + (sCur_Time.ucHours %
10);

sPhantom_Time[4] = 0x11; /* oscillator enabled, RESET disabled, day = 1 */ sPhantom_Time[5] = (((sCur_Time.ucDate / 10) << 4) + (sCur_Time.ucDate % 10
));

sPhantom_Time[6] = (((sCur_Time.ucMonth / 10) << 4) + (sCur_Time.ucMonth %
10 ));

sPhantom_Time[7] = (((sCur_Time.ucYear / 10) << 4 ) + (sCur_Time.ucYear %
10 ));
} /* end Convert_Time () */

/***************************************************************
    Local: unsigned char Get_Button_Val( void )

Description: This function contains the processing that ocurrs
                 when the keypad should be read. The value of the
                 button that is pressed is returned as an unsigned
                 character. If no button was pressed 0 is returned.
                 If the debounce timer was started 0xFF is returned.
***************************************************************/
void Get_Button_Val( unsigned char * ucKey_Pressed )
{
    unsigned char ucKey_Column1,
```

```c
                    uckey_Column2,
                    uckey_Row;

short i;

bKeypad_Timer_Expired = 0;

for( i = 0; i < NUM_ROWS; i++ )
    {
        uckey_Row = ~( 0x01 << i );
        KEYPAD_ROW = uckey_Row;       /* one's compliment of i, makes inverse */
        uckey_Column1 = ~PORTE;       /* one's compliment to invert bits so 1 =
 pressed */
        uckey_Column1 &= 0x1E;        /* clear the unwanted bits from this port.
                                         Key column on PE1 - PE4. */
        uckey_Column1 = uckey_Column1 << 3;  /* shift left 3 positions */ if( uckey_Column1 > 0 )       /* a key was pressed */
        {

/* pause 20ms to debounce key (not implemented) */ uckey_Column2 = ~PORTE;
            uckey_Column2 &= 0x1E;
            uckey_Column2 = uckey_Column2 << 3;  /* shift left 3 positions for
                                                    addition to the current row being pressed */ if( uckey_Column1 == uckey_Column2 )  /* a key was really pressed */
            {
                *uckey_Pressed = uckey_Column2 + uckey_Row;
                break;
            }
            else
            {
                *uckey_Pressed = 0;
            }
        }
        else
        {
            *uckey_Pressed = 0;
        }
    }
} /* end Get_Button_Val() */
/*******************************************************
 Local: Inc_Dec_Value( int, float *, int *, int * )

Description: This is the general processing routine for
              when the Increment or decrement key is pressed and the
              value can be incremented or decremented.
*******************************************************/
/*********************************************************************/
void Inc_Dec_Value( unsigned char uckey_Pressed, float* fValue,
                    short *sDecimals, unsigned char ucCur_Func )
{
    if( *sDecimals == 1 )
    {
        *fValue *= 10.0;
    }

/* INCREMENT button is pressed */
    if( uckey_Pressed == INCREMENT && sIncrement_Count == 0 )
    {
        sIncrement_Count++;
        *fValue += 1.0;
    }
    else if( uckey_Pressed == INCREMENT && sIncrement_Count > 0 )
    {
        sIncrement_Count++;

/* Increment the Ration total increasingly as the button is held */
        if(( sIncrement_Count >= 5 )&&
           ( sIncrement_Count < 25 )&&
           ( sIncrement_Count % 2 == 0 ))
        {
            *fValue += 1.0;
        }
        else if(( sIncrement_Count >= 25 )&&( sIncrement_Count < 45 ))
        {
            *fValue += 1.0;
        }
        else if(( sIncrement_Count >= 45 )&&( sIncrement_Count < 65 ))
        {
            *fValue += 10.0;
        }
        else if((( sIncrement_Count >= 65 )&&( sIncrement_Count < 85 ))||
                (( sIncrement_Count >= 65 )&&( ucCur_Func == NUM_HEAD )))
        {
            *fValue += 100.0;
            sIncrement_Count = ( ucCur_Func == NUM_HEAD )? 80 :
 sIncrement_Count;
        }
        else if( sIncrement_Count >= 85 )
        {
            *fValue += 1000.0;
            sIncrement_Count = 100;
        }
    }

/* DECREMENT button is pressed */
    if( uckey_Pressed == DECREMENT && sDecrement_Count == 0 )
    {
```

Page: 3
Date: 11/16/94
File: E72.C

```c
        sDecrement_Count++;
        *fValue -= 1.0;
    }
    else if( ucKey_Pressed == DECREMENT && sDecrement_Count > 0 )
    {
        sDecrement_Count++;

/* decrement the Ration total increasingly as the button is held */
        if(( sDecrement_Count > 5 )&&
           ( sDecrement_Count < 25 )&&
           ( sDecrement_Count % 2 == 0 ))
        {
            *fValue -= 1.0;
        }
        else if(( sDecrement_Count >= 25 )&&( sDecrement_Count < 45 ))
        {
            *fValue -= 1.0;
        }
        else if(( sDecrement_Count >= 45 )&&( sDecrement_Count < 65 ))
        {
            *fValue -= 10.0;
        }
        else if(( sDecrement_Count >= 65 )&&( sDecrement_Count < 85 )) ||
                (( sDecrement_Count >= 65 )&&( ucCur_func == NUM_HEAD )))
        {
            *fValue -= 100.0;
            sIncrement_Count = ( ucCur_func == NUM_HEAD )? 80 :
sIncrement_Count;
        }
        else if( sDecrement_Count >= 85 )
        {
            *fValue -= 1000.0;
            sDecrement_Count = 100;
        }
    } if( *sDecimals == 1 )
    {
/*      Adjust_Value( fValue ); */
        *fValue /= 10.0;
    }
} /* end Inc_Dec_Value() */

/*****************************************************************
    Local: void interrupt Real_Time( void )

Description: This function contains the processing that occurs
                 when a real time interrupt occurs.  The real time
                 interrupt is used to gauge the flow totalizing of
                 the feed in order to get as exact a total as possible.
*****************************************************************/

Page: 4
Date: 11/16/94
File: EZ2.C void interrupt Real_Time( void )
{
    ++vlRTIcount;
    TFLG2 = RTI_FLAG_CLEAR;
} /* end Real_Time() */

/*****************************************************************
    Local: void interrupt Display_Timer( void )

Description: This function contains the processing that occurs
                 when a output compare 2 interrupt occurs. This
                 interrupt is used to set a bit telling the main
                 routine to update the display.
*****************************************************************/
void interrupt Display_Timer( void )
{
    bDisplay_Timer_Expired = 1;
    TOC2 += DISPLAY_TIMER_RATE;
    TFLG1 = 0x40;
} /* end Display_Timer() */

/*****************************************************************
    Local: void interrupt Keypad_Timer( void )

Description: This function contains the processing that occurs
                 when a output compare 3 interrupt occurs. This
                 interrupt is used to check the keypad for input or that
                 debounce period has expired.
*****************************************************************/
void interrupt Keypad_Timer( void )
{
    bKeypad_Timer_Expired = 1;
    TOC3 += KEYPAD_TIMER_RATE;
    TFLG1 = 0x20;
} /* end Keypad_Timer() */

/*****************************************************************
    Function: Serial_Comm( void )

Description: Function called by serial communications system interrupt.
*****************************************************************/
void interrupt Serial_Comm( void )
{
    vucSerial_State = SCSR; /* read the SCSR register for status */
```

```c
/* Process_Serial_Port(); */
} /* end Serial_Comm */

/***************************************************************
    Function: hexdigit( unsigned )

Description: Convert a single digit to hexadecimal.
****************************************************************/
unsigned char hexdigit( unsigned uNum )
{
    if( uNum < 16 ) return( acMap[uNum] );
    return( '?' );
} /* end - hexdigit() */

/***************************************************************
    Function: checksum( unsigned char * )

Description: Compute checksum and return ptr to static array containing
                 returned value.
****************************************************************/
void checksum( unsigned char * cpData,   /* ptr to data string */
               int iDataLen )             /* length of data string */
{
    unsigned uChkSum;
    int iPos;

uChkSum = 0;
    for( iPos = 0; iPos < iDataLen; iPos++ )
    {
        uChkSum = ( ( uChkSum << 1 ) + (unsigned)cpData[iPos] ) & 0xFF;
    }
    acChkSum[0] = hexdigit( ( uChkSum >> 4 ) & 0xF );
    acChkSum[1] = hexdigit( uChkSum & 0xF );

/*  return( acChkSum ); */
} /* end - checksum() */

/***************************************************************
    Function: test_checksum( char *, int )

Description: Test checksum on a data string, return TRUE if ok,
                 FALSE if not.
****************************************************************/
int test_checksum(
    char * cpBuf,       /* ptr to data buffer */
    int    iDataLen )   /* length of data (preceding chksum characters) */
{
    checksum( cpBuf, iDataLen );
    if( memcmp( cpBuf + iDataLen, acChkSum, 2 ) == 0 )
        return( TRUE );

return( FALSE );
} /* end - test_checksum() */

/***************************************************************
    Function: ieform( char *string, int value, int width )

A minimal integer-to-ASCII-string formatter.  For use when you
    don't need printf(), and don't want its code size.  This is
    based on "itoa()" in Kernighan and Ritchie, 2nd edition, page 64.

Call it with a string buffer for the answer to be placed in, and the
    integer value.  Then you can puts() the string out later.

Note that there is no checking for bad conversions, etc.  Further, as
    K&R point out, this will misfire at n = -(2^wordsize-1).  If that is
    important, use the long version of this (lform() ), or fix this up.
    Otherwise, use this as it's nice and short.  uiform() is the unsigned
    version of this.
                                                    rps, 1 aug 89
****************************************************************/
void ieform( char *string, int value, int width )
{
    char i,j;       /* index variables; o.k. for strings up to
                       127 bytes in length   */
    char temp;
    int sign;

i = 0;

if( ( sign = value ) < 0 )
    {
        value = -value;
    }
    do
    {
        string[i++] = value % 10 + '0';
    }
    while(( value /= 10 ) > 0)||( i < width );

if( sign < 0 )
    {
        string[i++] = '-';
    }
    string[i] = '\0';
    /* Reverse string */
```

Page: 5
Date: 11/16/94
File: EZ2.C

```c
    i--;
    for( j = 0; j < i; j++, i-- )
    {
        temp = string[j];
        string[j] = string[i];
        string[i] = temp;
    }
} /* end ieform() */

/***********************************************************************
Function: fform(char *string, double value, int width)

A minimal floating-point-to-ASCII-string formatter.  For use when you
don't need printf(), and don't want its code size.  You can cut more out
of this if you are careful: See the comments below.  This is loosely
based on "itoa()" in Kernighan and Ritchie, 2nd edition, page 64.

Call it with a string buffer for the answer to be placed in, the
floating point value, and the width (not including decimal point) of the
string you want.  Then you can puts() the string out later.

Note that there is no checking for bad conversions, etc.  And never
expect floating point to be exact--it isn't the nature of the beast!

rps, 1 aug 89
************************************************************************
Update history:

Fixed field width alteration by decimal point and/or minus sign.
***************************************DPB 8 April 1991***********/
void fform(char * string,double value,int width)
{
    double n;
    int i, temp;
    double ovalue;
    int wc;
    int scale;

i = 0;
    wc = 0;
    scale = 0;

/* You could take the next line out, if you're careful about the width
/*                  you use as an argument to this function.     */
/*      if ((width < 1) || (width > 20)) width = 6; */ /* 8/1/94 ERP */

/* You could take the next block out if you NEVER will have
                                                negative values */
    if (value < 0.0)
    {
        value = -value;
        string[i++] = '-';
    }
/* If you always have values LESS than ten, you could take the
                                                next block out */
    while (ceil(value) >= 10) /* 08-02-94 ERP - added '=' to equation to
                                   include the value of 10.000000 */
    {
        value = value / 10.0;
        scale++;
    }
    do
    {
        if (wc == (scale + 1))
        {
            string[i++] = '.';
            wc++;
        }
        wc++;
        n = floor(value);
        string[i++] = (char)(temp % 10 + '0');
        temp = (int)n;
        ovalue = n * 10.0;
        value = (value * 10.0) - ovalue;
    } while (i < width);

string[i] = '\0';
} /* end fform() */

/***********************************************************************
Local: float Process_Keypress( unsigned char ucKey_Pressed,
                                short sCur_Function );

Description: This function contains the processing that ocurrs
              when a button has been pressed.  The value of the
              button that is pressed is in ucKey_Pressed, and the
              current function to process is in sCur_Function.
              The output value to be displayed is returned by
              this function.

************************************************************************/
float Process_Keypress( unsigned char ucKey_Pressed,
                        unsigned char ucPrev_Key_Pressed,
                        unsigned char ucCur_Function,
                        unsigned char ucPrev_Function,
                        short *sNum_Decimals )
{
    float fDisplay_Val = 0.0,
          fTemp;
```

Page: 6
Date: 11/16/94
File: EZ2.C

```c
ssTime_Cnt = ( ucCur_Function != DATE_TIME )? 0 : ssTime_Cnt;
ssSample_Time_Cnt = ( ucCur_Function != SAMPLE_TIME )? 0 :
ssSample_Time_Cnt;

if( ucCur_Function != CAL_LOAD_CELL )
{
    ssCalibrate_Cnt = 0;
    fCal_Bin_Weight = 0.0;
}
if( ucCur_Function != BIN_REFILL )
{
    bAdd_Bin_Weight = 0;
    fWeight_Change = 0.0;
}
if( ucCur_Function != FLOW_RATE )
{
    bNew_Flow_Rate = 0;
    fNew_Flow_Rate = 0.0;
}
switch( ucCur_Function )
{
    case TOTAL_WEIGHT:
        *sNum_Decimals = 1;
        /* clear has been requested for this function */
        if( bClear )
        {
            fTotal_Lbs = 0.0;
            bClear = 0;
        }
        fDisplay_Val = fTotal_Lbs;
        break;
    case SUB_TOTAL:
        *sNum_Decimals = 1;
        if( bClear )
        {
            fSub_Total = 0.0;
            bClear = 0;
        }
        fDisplay_Val = fSub_Total;
        break;
    case RATION_TOTAL:
        *sNum_Decimals = 1;
        /* CLEAR button was pressed */
        if( bClear )
        {
            fRation_Total = 0.0;
            bClear = 0;
        }
        if(( ucKey_Pressed == INCREMENT )||
           ( ucKey_Pressed == DECREMENT ))
        {
            fTemp = fRation_Total;
            Inc_Dec_Value( ucKey_Pressed, &fTemp, sNum_Decimals,
                ucCur_Function );
            fRation_Total = fTemp;
        }
        fDisplay_Val = fRation_Total;
        break;
    case DAILY_AVE:
        *sNum_Decimals = 2;
        /* CLEAR button was pressed */
        if( bClear )
        {
            fDaily_Ave = 0.0;
            bClear = 0;
        }
        fDisplay_Val = fDaily_Ave;
        break;
    case SEVEN_DAY_AVE:
        *sNum_Decimals = 2;
        if( bClear )
        {
            fThree_Day_Ave = 0.0;
            bClear = 0;
        }
        fDisplay_Val = fThree_Day_Ave;
        break;
    case FOURTEEN_DAY_AVE:
        *sNum_Decimals = 2;
        if( bClear )
        {
            fSeven_Day_Ave = 0.0;
            bClear = 0;
        }
```

Page: 7
Date: 11/16/94
File: E72.C

```c
fDisplay_Val = fSeven_Day_Ave;
break;

case DATE_TIME:
    if(( ucPrev_Function == DATE_TIME )&&
       ( uckey_Pressed == DATE_TIME ))
    {
        ssTime_Cnt++; /* use counter to determine what part of
                         the date or time is being set.
                         0 = view Date/Time
                         1 = set Month
                         2 = set Day
                         3 = set Year (2 digit)
                         4 = set Hour (24 hour fmt)
                         5 = set Minute */
    }
    switch( ssTime_Cnt )
    {
    case 1: /* set Month */
        *sNum_Decimals = 0;
        if(( uckey_Pressed == INCREMENT )||
           ( uckey_Pressed == DECREMENT ))
        {
            fTemp = ((float)sCur_Time.ucMonth;
            Inc_Dec_Value( uckey_Pressed, &fTemp, sNum_Decimals,
                           ucCur_function );
            if( fTemp > 12.9 )
            {
                fTemp = 1.0;
            }
            else if( fTemp < 1.0 )
            {
                fTemp = 12.0;
            }
            sCur_Time.ucMonth = (unsigned char)fTemp;
        }
        fDisplay_Val = ((float)sCur_Time.ucMonth;
        break;

case 2: /* set Day */
        *sNum_Decimals = 0;
        if(( uckey_Pressed == INCREMENT )||
           ( uckey_Pressed == DECREMENT ))
        {
            fTemp = ((float)sCur_Time.ucDate;
            Inc_Dec_Value( uckey_Pressed, &fTemp, sNum_Decimals,
                           ucCur_function );
            if( fTemp > ((float)ucMax_Month( sCur_Time.ucMonth ) )
            {
                fTemp = 1.0;
            }
            else if( fTemp < 1.0 )
            {
                fTemp = ((float)ucMax_Month( sCur_Time.ucMonth );
            }
            sCur_Time.ucDate = (unsigned char)fTemp;
        }
        fDisplay_Val = ((float)sCur_Time.ucDate;
        break;

case 3: /* set Year */
        *sNum_Decimals = 0;
        if(( uckey_Pressed == INCREMENT )||
           ( uckey_Pressed == DECREMENT ))
        {
            fTemp = ((float)sCur_Time.ucYear;
            Inc_Dec_Value( uckey_Pressed, &fTemp, sNum_Decimals,
                           ucCur_function );
            if( fTemp > 99.9 )
            {
                fTemp = 0.0;
            }
            else if( fTemp < 0.0 )
            {
                fTemp = 99.0;
            }
            sCur_Time.ucYear = (unsigned char)fTemp;
        }
        fDisplay_Val = ((float)sCur_Time.ucYear;
        break;

case 4: /* set Hour */
        *sNum_Decimals = 0;
        if(( uckey_Pressed == INCREMENT )||
           ( uckey_Pressed == DECREMENT ))
        {
            fTemp = ((float)sCur_Time.ucHours;
            Inc_Dec_Value( uckey_Pressed, &fTemp, sNum_Decimals,
                           ucCur_function );
            if( fTemp > 23.9 )
            {
                fTemp = 0.0;
            }
            else if( fTemp < 0.0 )
```

Page: 8
Date: 11/16/94
File: EZ2.C

```
            {
            fTemp = 23.0;
            }
            sCur_Time.ucHours = (unsigned char)fTemp;

*sNum_Decimals = -2;
            fDisplay_Val = (float)sCur_Time.ucHours;
            break;

case 5: /* set Minute */
            *sNum_Decimals = 0;

if(( uckey_Pressed == INCREMENT )||
               ( uckey_Pressed == DECREMENT ))
            {
            fTemp = (float)sCur_Time.ucMinutes;
            Inc_Dec_Value( uckey_Pressed, &fTemp, sNum_Decimals,
                           ucCur_Function );

if( fTemp > 59.9 )
            {
            fTemp = 0.0;
            }
            else if( fTemp < 0.0 )
            {
            fTemp = 59.0;
            }
            sCur_Time.ucMinutes = (unsigned char)fTemp;
            }
            fDisplay_Val = (float)sCur_Time.ucMinutes;
            break;

case 6: /* write new time & date to clock */
            Write_Clock();

ssTime_Cnt = 0;

case 0: /* display time */
            Read_Clock();

*sNum_Decimals = -1;
            if( sCur_Time.ucHours > 12 )
            {
            fDisplay_Val = ((float)(sCur_Time.ucHours-
'2)*100+sCur_Time.ucMinutes );
            }
            else if( sCur_Time.ucHours == 0 )
            {
            fDisplay_Val = ((float)( 1200 + sCur_Time.ucMinutes );
            }
            else
            {
            fDisplay_Val =
((float)(sCur_Time.ucHours*100+sCur_Time.ucMinutes );
            }
            break;

default: /* reset counter to 0 */
                    ssTime_Cnt = 0;
            }
            break;

case CAL_LOAD_CELL:
            *sNum_Decimals = 1;

if(( ucPrev_Function == CAL_LOAD_CELL )&&
               ( uckey_Pressed == CAL_LOAD_CELL ))
            {
            ssCalibrate_Cnt++; /* increment calibrate function counter */
            } if(( ssCalibrate_Cnt == 0 )&&
               (( uckey_Pressed == INCREMENT )||
                ( uckey_Pressed == DECREMENT )))
            {
            Inc_Dec_Value( uckey_Pressed, &fCal_Bin_Weight, sNum_Decimals,
ucCur_Function );
            }
            else if(( fBin_Weight != fCal_Bin_Weight )&&( ssCalibrate_Cnt == 1
))
            {
            /* save the current values before calibration */
            Save_Data();

/* Then recalculate all values, totals and averages */
            Recalculate_Flow();

fCal_Bin_Weight = 0.0;
            }
            fDisplay_Val = fCal_Bin_Weight;
            break;

case SAMPLE_TIME:
            if( fNum_Head < 1 )
            {
            *sNum_Decimals = -10;
            fDisplay_Val = NO_HEAD;
            break;
            } if(( ucPrev_Function == SAMPLE_TIME )&&
```

Page: 9
Date: 11/16/94
File: EZ2.C

```c
( ucKey_Pressed == SAMPLE_TIME ))
{
    ssSample_Time_Cnt++; /* use counter to determine what part of
                            the date or time is being set.
                            0 = view Sample Time
                            1 = set Hour (24 hour fmt)
                            2 = set Minute */
}
switch( ssSample_Time_Cnt )
{
    case 1: /* set Hour */
        *sNum_Decimals = 0;

if(( ucKey_Pressed == INCREMENT )||
           ( ucKey_Pressed == DECREMENT ))
        {
            fTemp = (float)sSample_Time.ucHours;
            Inc_Dec_Value( ucKey_Pressed, &fTemp, sNum_Decimals,
                           ucCur_Function );

if( fTemp > 23.9 )
            {
                fTemp = 0.0;
            }
            else if( fTemp < 0.0 )
            {
                fTemp = 23.0;
            } sSample_Time.ucHours = (unsigned char)fTemp;
        }
        *sNum_Decimals = -2;
        fDisplay_Val = (float)sSample_Time.ucHours;
        break;

case 2: /* set Minute */
        *sNum_Decimals = 0;

if(( ucKey_Pressed == INCREMENT )||
           ( ucKey_Pressed == DECREMENT ))
        {
            fTemp = (float)sSample_Time.ucMinutes;
            Inc_Dec_Value( ucKey_Pressed, &fTemp, sNum_Decimals,
                           ucCur_Function );

if( fTemp > 59.9 )
            {
                fTemp = 0.0;
            }
            else if( fTemp < 0.0 )
            {
                fTemp = 59.0;
            } sSample_Time.ucMinutes = (unsigned char)fTemp;
            fDisplay_Val = ((float)sSample_Time.ucMinutes;
        }
        break;

case 3:
        ssSample_Time_Cnt = 0;

case 0: /* display time */
        *sNum_Decimals = -1;

if(( sSample_Time.ucHours > 12 )
        {
            fDisplay_Val = (float)((sSample_Time.ucHours-
                           12)*100+sSample_Time.ucMinutes );
        }
        else if( sSample_Time.ucHours == 0 )
        {
            fDisplay_Val = (float)( 1200 + sSample_Time.ucMinutes );
        }
        else
        {
            fDisplay_Val =
            (float)(sSample_Time.ucHours*100+sSample_Time.ucMinutes );
        }
        break;

default: /* reset counter to 0 */
        ssSample_Time_Cnt = 0;
}
break;

case NUM_HEAD:
    *sNum_Decimals = 0;

if( bClear )
    {
        fNum_Head = 0.0;
        bClear = 0;
    } if(( ucKey_Pressed == INCREMENT )||
       ( ucKey_Pressed == DECREMENT ))
    {
        fTemp = fNum_Head;
        Inc_Dec_Value( ucKey_Pressed, &fTemp, sNum_Decimals,
                       ucCur_Function );
        fNum_Head = fTemp;
    }
```

Page: 10
Date: 11/16/94
File: EZ2.C

```c
            }
            fDisplay_Val = fNum_Head;
            break;

case FLOW_RATE:
            *sNum_Decimals = 1;

if(( ucKey_Pressed == FLOW_RATE )&&
               ( bNew_Flow_Rate )&&
               ( fNew_Flow_Rate != fFlow_Rate ))
            {
                Save_Data(); /* save the current data with the old flow rate */
                fFlow_Rate = fNew_Flow_Rate;
                fNew_Flow_Rate = 0.0;
                bNew_Flow_Rate = 0;
            }
            fDisplay_Val = fFlow_Rate;

if(( ucKey_Pressed == INCREMENT )||
               ( ucKey_Pressed == DECREMENT ))
            {
                if( bNew_Flow_Rate == 0 )
                {
                    fNew_Flow_Rate = fFlow_Rate;
                    bNew_Flow_Rate = 1;
                }
                Inc_Dec_Value( ucKey_Pressed, &fNew_Flow_Rate, sNum_Decimals,
ucCur_Function );
                fDisplay_Val = fNew_Flow_Rate;
            }
            else if(( ucPrev_Key_Pressed == INCREMENT )||
                    ( ucPrev_Key_Pressed == DECREMENT )&&
                    (( sfDisplay_Val == fNew_Flow_Rate )&&
                     ( ucPrev_Key_Pressed == 0 ))&&
                    ( bNew_Flow_Rate ))
            {
                fDisplay_Val = fNew_Flow_Rate;
            } break;

case BIN_REFILL:
            *sNum_Decimals = 1;

if(( ucKey_Pressed == BIN_REFILL )&&
               ( bAdd_Bin_Weight )&&
               ( fWeight_Change != 0.0 ))
            {
                fBin_Weight += fWeight_Change;
                sBin_Wt[ sBin_Index ].ucDay = sCur_Time.ucDate;
                sBin_Wt[ sBin_Index ].ucMonth = sCur_Time.ucMonth;
                sBin_Wt[ sBin_Index ].ucYear = sCur_Time.ucYear;
                sBin_Wt[ sBin_Index ].fBin_Wt_Added = fWeight_Change;

fWeight_Change = 0.0;
                bAdd_Bin_Weight = 0;
                sBin_Index++;
            } fDisplay_Val = fBin_Weight;

if(( ucKey_Pressed == INCREMENT )||
               ( ucKey_Pressed == DECREMENT ))
            {
                Inc_Dec_Value( ucKey_Pressed, &fWeight_Change, sNum_Decimals,
ucCur_Function );
                fDisplay_Val = fWeight_Change;
                bAdd_Bin_Weight = 1;
            }
            else if(( ucPrev_Key_Pressed == INCREMENT )||
                    ( ucPrev_Key_Pressed == DECREMENT )&&
                    (( sfDisplay_Val == fWeight_Change )&&
                     ( ucPrev_Key_Pressed == 0 )))
            {
                fDisplay_Val = fWeight_Change;
            } break;
    }
    return( fDisplay_Val );
} /* end Process_Keypress() */
```

```
/* EZ.H ****************************************************
 Copyright (C) CIM Software Corporation, 1994. All Rights Reserved.
 ==========================================================
               C I M   S O F T W A R E   C O R P O R A T I O N
                         5735 Lindsay Street
                     Minneapolis, Minnesota 55422
                            (612) 544-1752
 ==========================================================
 Developed for:
   Easy Systems Inc. Trimont, MN. (& Extron). CIM Job Number C94-617

Description:
   This is the include file for EZ.C

Revision History:
   Eric Peterson, CIM Software Corporation           - 04/01/94
   Initial Version (1.0)
 ****************************************************
 ****************************************************/

/*
    FUNCTION DECLARATIONS
*/ void    Initialize_Program( void );

void    Display_Update( float, short );

extern float   Process_Keypress( unsigned char, unsigned char, unsigned char,
unsigned char, short* );

void    Calculate_Averages( void );

void    Recalculate_Flow( void );

void    Save_Data( void );

void    interrupt Process_Serial_Port( void );

extern void    fformt( char *, double, int );

extern void    ieform( char *, int, int );

extern void    Get_Button_Val( unsigned char * );

extern void    Inc_Dec_Value( unsigned char, float *, short *, unsigned char );

extern void    interrupt Real_Time( void );

extern void    interrupt Display_Timer( void );

extern void    interrupt Keypad_Timer( void );

extern void    interrupt Serial_Comm( void );

extern unsigned char   hexdigit( unsigned );

extern void    checksum( unsigned char *, int );

extern int     test_checksum( char *, int );

extern void    Phantom_Clock_Pattern( void );

extern void    Read_Clock( void );

extern void    Write_Clock( void );

extern void    Convert_Time( unsigned char * );

Page: 1
Date: 11/16/94
File: EZ.H
```

I claim:

1. A livestock feed consumption meter for use in combination with a bulk feed storage bin having a feed delivery motor operably attached to a feed discharge system, the consumption meter comprising:

means for sensing the operation of the motor; and a data processing unit connected in communication with the motor sensing means, the data processing unit including:

data receiving means for receiving data from the motor sensing means;

data input means for inputting data relevant to livestock feed consumption, wherein the data input means includes a key pad having keys operable to set parameters including;

setting current date and time;

setting an number of animals to be fed;

setting an estimated feed flow rate from the storage bin;

setting an amount of feed added to the storage bin; and setting a periodic sampling time for moving daily memory registers to history registers and updating average feed consumption records;

data storage means for storing the motor sensing data and the inputted data;

data processing means for processing the motor sensing data and the inputted data; and display means for displaying the inputted data and processed data.

2. The consumption meter of claim 1 wherein the feed delivery motor is an electrical motor.

3. The consumption meter of claim 2 wherein the motor sensing means is a dry contact switch.

4. The consumption meter of claim 2 wherein the motor sensing means is a transformer.

5. The consumption meter of claim 2 wherein the motor sensing means is a transformer coupled to and disposed to activate a dry contact switch.

6. The consumption meter of claim 1 wherein the key pad further include keys operable to display data including:

displaying set parameters;

displaying daily average, three day average, and seven day average feed consumption;

displaying subtotal and total amounts of feed consumed by the animals; and displaying total amount of feed remaining in the storage bin.

7. The consumption meter of claim 6 wherein the key pad further include keys operable to calibrate the estimated feed flow rate based on a comparison of an actual amount of feed remaining in the storage bin to a calculated amount of feed remaining in the storage bin.

8. The consumption meter of claim 6 wherein the display means is an LED display.

9. The consumption meter of claim 8 wherein the updated daily average feed consumption is displayed on the LED display at all times when other data is not be displayed.

10. A method of monitoring average daily livestock feed consumption from a bulk feed storage bin having a feed delivery motor operably attached to a feed discharge system, means for sensing the operation of the motor, and a data processing unit operably connected in communication with the motor operation sensing means, the monitoring method comprising the steps of:

charging an amount of livestock feed into the storage bin;

inputting and setting parameters into the data processing unit including:

current date and time;

a number of animals to be fed;

an estimated feed flow rate from the storage bin;

the amount of feed charged into the storage bin; and a periodic sampling time for moving daily memory registers to history memory registers and updating average feed consumption records;

activating the feed delivery motor to discharge feed from the storage bin to be fed to the animals;

sensing the operation of the motor by the data processing unit and estimating the amount of feed discharged from the storage bin by multiplying the time the motor is operated by the estimated feed flow rate;

calculating and storing in the data processing unit data concerning the amount of feed discharged from the storage bin and average feed consumption of the animals; and periodically calibrating in the data processing unit the estimated feed flow rate based on a comparison of an actual amount of feed remaining in the storage bin and a calculated amount of feed remaining in the storage bin.

11. The method of claim 10 wherein the calibration step includes adjusting in the data processing unit the estimated feed flow rate by a predetermined formula when the actual amount of feed remaining in the storage bin is different from the calculated amount of feed remaining in the storage bin.

12. The method of claim 11 wherein the calibration step further includes adjusting in the data processing unit the stored data by a predetermined formula based on the amount of feed charged into the storage bin, wherein the difference is distributed over each of the days since the last calibration.

* * * * *